United States Patent [19]

Ting

[11] 4,285,847

[45] Aug. 25, 1981

[54] POLYMERIZATION PROCESS AND PRODUCT

[75] Inventor: Vincent W. Ting, Boulder, Colo.

[73] Assignee: SCM Corporation, Cleveland, Ohio

[21] Appl. No.: 29,106

[22] Filed: Apr. 11, 1979

[51] Int. Cl.$^3$ .............................................. C08L 63/00
[52] U.S. Cl. .................... 260/29.2 EP; 260/29.2 TN; 260/292 E; 260/29.2 UA; 260/29.4 UA; 260/29.6 WB; 260/29.6 RB; 260/29.6 RW; 260/29.6 NR; 525/63; 525/65; 525/70; 525/78; 525/87
[58] Field of Search ............... 260/29.2 EP, 29.6 NR, 260/29.2 TN, 29.2 E, 29.2 UA, 29.6 WB, 29.6 RB, 29.6 RW, 29.4 UA; 525/65, 63, 78, 69, 70, 87

[56] References Cited

U.S. PATENT DOCUMENTS

| | | | |
|---|---|---|---|
| 3,028,359 | 4/1962 | Gaylord | 260/45.2 |
| 4,049,744 | 9/1977 | Masters | 260/837 R |
| 4,128,519 | 12/1978 | Bartoszek et al. | 260/29.6 NR |

*Primary Examiner*—Theodore E. Pertilla
*Attorney, Agent, or Firm*—Irons and Sears

[57] ABSTRACT

Increasing the solids content of an aqueous dispersoid of:

(a) a resin having aliphatic backbone carbons;
(b) addition polymer, and
(c) graft polymer consisting of addition polymer grafted to the aliphatic carbon atoms of said resin;

which comprises bringing together ethylenically unsaturated monomer, initiator, and such dispersoid, and polymerizing the such monomer in situ.

Preferred products produced are water-reducible epoxy resin-based. These are produced by a process which comprises initiating addition polymerization of ethylenically unsaturated monomer in the presence of such dispersoid.

46 Claims, No Drawings

POLYMERIZATION PROCESS AND PRODUCT

FIELD OF THE INVENTION

This invention relates to a process for increasing the addition polymer content of a resinous reaction product in a liquid vehicle. More particularly, the invention is concerned with a process for incorporating in a water-reducible, epoxy-based aqueous dispersion a quantity of addition polymer such as polystyrene, that is polymerized in situ in the dispersion. The invention is also concerned with products produced by these processes, and particularly, with water-reducible, epoxy-based coating compositions.

RELATED PATENT APPLICATIONS

The subject matter of the present patent application is related to the subject matter of several other patent applications, the teachings of each of which, particularly as identified below, are all incorporated herein by reference.

The earliest-filed application on related technology is Ser. No. 685,246, filed May 11, 1976, and now abandoned.

Another patent application on related subject matter is Ser. No. 788,611, filed April 18, 1977, and now U.S. Pat. No. 4,212,781, patented July 15, 1980, which was a continuation-in-part of the first-filed patent application, and has been published as Belgian Pat. No. 854,476, granted Nov. 10, 1977, and as German OS No. 2,721,822, published Nov. 24, 1977.

A third application on related subject matter is Ser. No. 788,454, filed Apr. 18, 1977, and now abandoned, which was also a continuation-in-part of the first-filed patent application. This third patent application was abandoned in favor of Ser. No. 793,507, filed May 4, 1977, and now abandoned, which is published as Belgian Pat. No. 854,523, granted Nov. 14, 1977, as German OS No. 2,721,823.1, and as Dutch patent application 77.05236, published Nov. 11, 1977. Application Ser. No. 793,507 is a continuation-in-part of Ser. No. 788,454.

BACKGROUND FOR THE PRESENT INVENTION

Graft polymers, formed between epoxy resins and addition polymers, generally formed from monomer including an acrylic acid, are suggested in these earlier applications and in certain prior art for use in coating compositions.

In the art prior to these applications, it appears that the so-called graft polymer has been an adduct formed by an esterification reaction between an acidic addition polymer and an epoxy resin. The techniques for making epoxy-based resins water-dispersible, through inversion with amines, and for cross-linking them with added aminoplast, are well known. None of the prior art adduct products has been fully satisfactory. The adducts and coating compositions formed from them do not have good resistance to water, because the adducts are susceptible to hydrolysis.

In application Ser. No. 685,246, there are disclosed processes for making curable resinous compositions and coatings that are unique. The coating compositions are particularly valuable when formulated for use as sanitary coatings, that is, as coatings for cans for edible materials. Such can coating compositions are easy to apply in existing equipment, have excellent shelf stability, and after application and curing have excellent functional properties as coatings and are bland and so do not impart any flavor to the food or beverage in the can.

In one embodiment, that application discloses a process for preparing a curable resinous composition having an Acid Number of at least 30, by reacting together at 90° C. to 130° C. an aromatic diepoxide resin having a molecular weight above 1,000 and addition polymerizable monomer of which from 10% to 80% by weight is an acrylic acid, the diepoxide resin being present in sufficient quantity to provide from 30% to 90% by weight of the initial reaction mixture, in the presence of a free radical initiator of the benzoyl peroxide type. During the reaction there is simultaneous addition polymerization of the monomer through its ethylenic unsaturation and grafting of addition polymer to the diepoxide resin. The graft polymr is characterized by the substantial absence of hydrolyzable functional groups. The acid functionality of the reaction mixture is sufficiently high to effect stable dispersion of the product in a basic aqueous medium.

In a preferred embodiment, an aromatic diepoxide, a polyglycidyl ether of bisphenol A, is reacted with a mixture of additional polymerizable monomers containing a major amount of methacrylic acid. The epoxy resin has a molecular weight above 4,000 and provides from 50% to 90% of the initial reaction mixture, and the reaction takes place in the presence of benzoyl peroxide at an elevated temperature up to 130° C., to effect addition polymerization of the monomer and to produce a graft polymer of addition polymer to the diepoxide. The reaction product may be dispersed in a basic aqueous medium, to form a water-reducible sanitary coating composition.

As is more particularly pointed out in patent application Ser. No. 788,611, the resinous reaction product produced contains three polymeric components, namely, the graft polymer, ungrafted diepoxide resin, and ungrafted addition polymer.

As is pointed out in Ser. No. 793,507, the initial epoxy resin, that is employed in the graft polymer production process, may be terminated to eliminate part or all of the terminal epoxy groups, so as to eliminate the possibility of ester grafting.

As is disclosed in these prior applications, in order to make acceptable water-reducible coating compositions, the addition polymerizable monomer comprises a major proportion of an unsaturated carboxylic acid, preferably either acrylic or methacrylic acid. Preferably, sufficient acid is employed so that the Acid Number (NV, i.e., based on non-volatiles) of the reaction product is from about 30 to 200, and preferably, 45 to 150. The acid functionality of compositions prepared in accordance with these several patent applications is derived from the acid functionality of the graft polymer component and of the ungrafted addition polymer component of the compositions. When the carboxyl groups are ionized by the addition of amine or other fugitive base to an aqueous vehicle containing such a composition, a stable dispersion is produced that is water-reducible. Such dispersions are stable over long storage periods even at somewhat elevated temperatures, and remain free from gelation and precipitation; only slight changes occur in pH levels and viscosities, indicating very little change in composition.

The reaction products of these prior applications appear to have remarkable properties. They are believed to serve as the means by which the ungrafted epoxy resin component is kept in stable suspension.

For sanitary coating applications, the preferred compositions are obtained from initial reaction mixtures in which the solids are derived 50% or more by weight from an epoxy resin having a molecular weight of about 4,000 or more, and the balance from addition polymerizable monomer of which the major proportion is acrylic or methacrylic acid. In a more preferred embodiment of a sanitary coating composition, the solids of the reaction mixture are derived from an epoxy resin that contributes from 60% to 90% and preferably about 80% by weight of the solids, the balance being a monomer mixture of methacrylic acid, styrene, and ethyl acrylate, where the acid is the predominant monomer. The preferred sanitary coating compositions produced from such reaction mixtures have Acid Numbers (N.V.) in the range from about 80 to about 90 and preferably about 85.

While resinous coating compositions of these kinds have excellent functional characteristics and other highly desirable properties, their high content of epoxy resin increases their cost. It would therefore be highly desirable to find some way to produce functionally equivalent materials, at lower cost.

Still another important consideration is the release of solvent materials into the atmosphere. In the process of making the reaction products of the patent applications described above, it has been customary to use liquid organic solvents, for the purpose of facilitating handling during the manufacturing process, and to improve application properties.

In the most preferred embodiment of the invention, for example, it has been customary to use two different solvents, a first solvent in which the epoxy resin, the graft polymer, and the addition polymer are all soluble, (although not necessarily in solution), and a second solvent that can dissolve the addition polymer product and that can solvate the addition polymer side chains of the graft polymer. These solvents remain with the resinous reaction product after it is inverted by the addition of water and a fugitive base. Consequently, when an applied coating is cured, which is usually accomplished by heating, the solvent is driven off and ordinarily escapes into the atmosphere. With the present concern over the release of organic solvent materials into the atmosphere, it is highly desirable that coating compositions be prepared in such manner as to reduce to the smallest feasible percentage the amount of organic solvent liquid present.

BRIEF SUMMARY OF THE INVENTION

In its broadest aspects, the invention provides new polymeric products and processes. The new processes permit the custom design of large molecules, to suit particular needs.

One feature of the invention resides in the use of a graft polymer, having ionizable side chains, as a means for promoting the polymerization of added ethylenically unsaturated (vinyl) monomer to the form of fine particles. Generally, this is done in an aqueous dispersion of the graft polymer. Preferably the graft polymer is resistant to hydrolysis, so that it remains stable not only in aqueous dispersion but also after being applied as a coating and cured.

In one preferred embodiment, the present invention provides substantially functionally equivalent coating compositions to those described above in the earlier patent applications, but with the advantages that the compositions of the present invention may be formulated to be significantly less expensive and to release less solvent, proportionally by weight, into the atmosphere upon curing.

In another preferred embodiment, the present invention is a process for polymerizing in situ an added quantity of addition polymerizable monomer containing ethylenic (vinyl) unsaturation, in an aqueous dispersion of a resinous reaction product produced in accordance with a process of one of the earlier-filed patent applications described above, that contains as the resinous component thereof a mixture of graft polymer, unreacted epoxy resin, and ungrafted addition polymer. The net result of the use of a process according to the present invention is to reduce substantially the percentage of the final composition represented by initial epoxy resin and increase substantially the percentage of the final composition formed from the ordinarily much less expensive addition polymerizable monomer. Another useful result is an increase in the solids content of the composition and the consequent decrease in the relative proportion of total organic solvent by weight of the composition, which proportion may be further reduced by the addition of water during or after the addition polymerization reaction.

Another feature of the present invention resides in the use for the in situ vinyl polymerization of a graft polymer-containing reaction product in which the graft polymer and the ungrafted addition polymer are base-functional, so that they are inverted in water by the addition of a fugitive acid (i.e., an acid that volatilizes during curing of the coating).

DETAILED DESCRIPTION OF THE PRIOR INVENTIONS

The Process and Product of the Earlier Applications

The prior inventions are most easily understood from a description of one specific preferred embodiment.

When making a sanitary coating composition in accordance with one preferred embodiment of the earlier patent applications described above, 70 to 80 parts by weight of a diepoxide resin are placed in a reaction vessel with a small amount of a solvent, such as, for example, 2-butoxyethanol-1. The epoxy resin may be purchased and used as is, in which case an initial molecular weight resin of about 8,000 is preferred, or alternatively, a low molecular weight epoxy resin may be reacted further with bisphenol A to produce an epoxy resin having a molecular weight of about 8,000.

A mixture of monomers containing ethylenic unsaturation is then prepared. In one preferred embodiment, this mixture is formed from about 65 weight percent methacrylic acid, 34 weight percent styrene, and 1 weight percent ethyl acrylate. Benzoyl peroxide (BPO) is incorporated in the mixture in an amount equivalent to about 6.7% of the monomer mixture by weight. This mixture is then added to the reaction vessel containing the epoxy resin over a period of time, at a temperature in the range from 110° C. to about 130° C., preferably about 118° C., to cause the reaction to go forward. Sufficient butanol and 2-butoxy-ethanol-1 are added to facilitate agitation.

It is very difficult to make an accurate analysis of the reaction product that is obtained. However, current indications are that on a dry solids basis, the reaction product from the reaction of about 80 parts of epoxy resin and about 20 parts of ethylenically unsaturated monomer in the presence of about 1.4 parts of benzoyl peroxide (all parts being by weight) contains three different components, as follows:

1. about 37.6% of unreacted epoxy resin;
2. about 7.2% by weight of ungrafted addition polymerized (vinyl) monomer, and
3. about 55.2% of a graft polymer, in which 64% of the original addition polymerizable monomer has grafted (as addition copolymer) to about 53% of the original epoxy resin.

Studies on this reaction and the product produced indicate that grafting takes place at aliphatic backbone carbons of the epoxy resin that have either one or two hydrogens bonded thereto in the ungrafted state. Pictorially, bonding takes place at one of the carbons indicated by the arrows below:

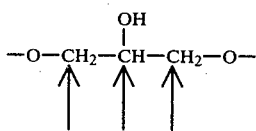

The graft polymer product consists of an epoxy resin molecule, of about 8,000 molecular weight, grafted with, on the basis of statistically averaged information, about two short chains of addition copolymer per molecule of epoxy resin, the molecular weight of each chain being about 1,000, so that the molecular weight of the graft polymer itself is about 10,000. This structure is one that can be represented generally as follows:

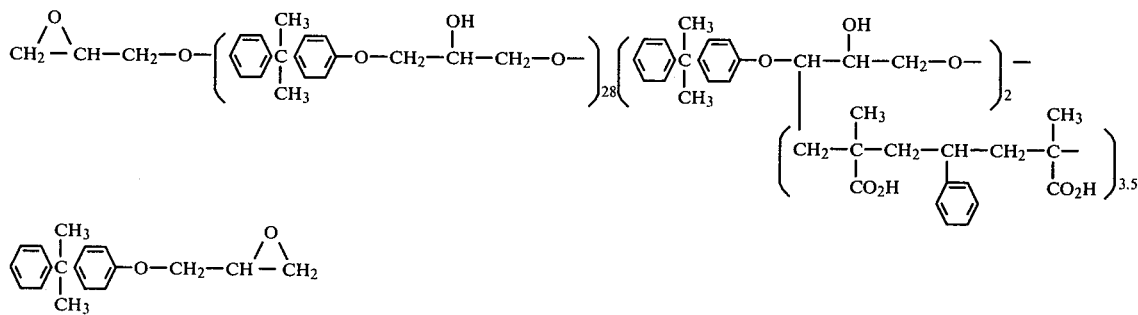

Gel permeation chromatography indicates that the molecular weight of the unreacted epoxy resin in the final product is somewhat lower than that of the initial epoxy resin, indicating that higher molecular weight epoxy resin tends to be grafted preferentially. This probably occurs because there are more grafting sites per molecule in the higher molecular weight epoxy resin molecules.

The available analytical data also indicates that during the polymerization of the addition polymerizable (vinyl) monomer, very little homopolymer is formed.

The resinous reaction product, which is a mixture of the three components described, has an Acid Number of about 85, and a percent oxirane, as determined by the analytical method described in the patent applications described above, of about 0.35, or less.

During the manufacturing process, the solvent content of the product is adjusted periodically so that in this preferred embodiment, the final product is about 58%–60% by weight solids, the balance being a solvent system consisting of a mixture of n-butanol and 2-butoxyethanol-1.

To prepare a coating composition useful for spray application to cans for beverages, the resinous reaction product is mixed with deionized water and a fugitive base, which in the preferred embodiment is dimethyl ethanolamine. Sufficient water is employed so that the nonvolatiles content of the composition is about 21% to 24%, with a pH of about 7.8. About 10% to 11% by weight of the initial epoxy resin of a suitable crosslinking aminoplast resin, such as, for example Cymel 370, a product of American Cyanamid Company, is then added. After thorough mixing, the dispersion resulting remains stable on storage indefinitely. It sprays readily with particularly good application properties. It cures rapidly on baking. The coatings produced are bland, and do not impart any undesirable organoleptic property or haze to a canned beverage or other food product.

The difficulty in analyzing the resinous reaction product obtained from the graft polymerization step cannot be overemphasized. Moreover, the composition of the product obtained depends upon the initial molecular weight of the epoxy resin, the proportions of the reactants, and the amount of BPO or equivalent initiator employed, among other factors. Consequently, for the preferred embodiment described above, the analytical data reported should be understood to be approximate. The proportion of the molecular weight of the graft polymer that is contributed by the addition polymer side chains is particularly difficult to determine, but probably is in the range from about 16% to about 20%.

One of the interesting properties observed, as to the resinous reaction product, was that the Tg of the resinous reaction product is about 30° C.–65° C. This compares with much higher Tg values for the initial epoxy resin component; for a copolymer that is prepared by the addition polymerization of a monomer mixture such as was used; and for a mixture of the initial epoxy resin with such a copolymer; the Tg values for these being, respectively, generally in the range from about 80° C. to 85° C.; about 110° C.; and about 75° C. to 80° C.

The particular components employed, and their proportions, for making the resinous reaction product containing the graft polymer, are subject to a rather broad discretion, depending upon the intended application. Thus, the epoxy resin employed may have a molecular weight in the range from about 350 to about 40,000 or higher, the limiting factor being the ability to handle the epoxy resin on a practical commercial basis. The amount of epoxy resin may be in the range from about 5% by weight to about 95% by weight of the initial reaction mixture, dry solids basis.

For making electrocoating compositions, generally the amount of epoxy resin in the initial reaction mixture should be from 40% to 80%, and preferably 60% to 70%, with a molecular weight in the range from about 1,000 to 10,000, and preferably, about 3,500 to 4,000. For this type of application, it is preferred that the epoxy resin be terminated, as by reaction with a phenol. The ethylenically unsaturated monomer mixture preferably contains from 45% to 70% by weight of methacrylic acid, based on the weight of the monomer mixture, and preferably, about 60%, the balance being styrene or other inexpensive monomer. The high acid content produces an anionic system. For a cationic system, the resinous reaction product is reacted with an amine, which may be a secondary, tertiary or even a quaternary amine.

To formulate a usable electrocoating composition, the resinous reaction product obtained is inverted in an aqueous vehicle with a fugitive base, and preferably, a cross-linking aminoplast resin is added.

To make a sprayable sanitary coating composition, the molecular weight of the epoxy resin preferably is in the range from 4,000 to 40,000, or more preferably for practical manufacturing processing, in the range from about 8,000 or 12,000 or so. The proportion of epoxy resin in the initial reaction mixture may be from 50% to 90%, and preferably, it is from about 60% to about 90% by weight, and most preferably, 70% to 80%. Sufficient methacrylic acid or the equivalent should be employed in the monomer component so that the Acid Number of the resinous reaction product, based on solids, is in the range from 80 to 90. For use it is inverted in water and preferably a cross-linker is added. The coating is baked to cure it.

The resinous reaction product can also be employed in the formulation of powdered coatings. For this type of application, a small amount of epoxy resin of low molecular weight is adequate. While solvents may be employed, generally a bulk melt reaction is adequate. For this type of application, the resinous reaction product should be formulated to have a Tg of about 65° C.

For all of these applications, the amount of benzoyl peroxide or other equivalent initiator employed should be above 3% by weight based on the monomer, preferably more than 4% and most preferably in the range from about 6% to 7%. This permits the use of reaction temperatures in the range from about 110° C. to about 130° C., for efficient operation. If the epoxy resin is terminated, however, higher reaction temperatures can be employed. If active epoxy groups are present, temperatures above about 130° C. tend to favor ester formation, rather than carbon-to-carbon grafting.

DETAILED DESCRIPTION OF THE PRESENT INVENTION

To practice the present invention, in one embodiment thereof, the resinous reaction product, that includes the acid-functional graft polymer, is subjected to inversion in water in the presence of a fugitive base (i.e., a base that is driven off or volatilized at elevated curing temperatures), and additional monomer is added to the dispersion together with additional initiator. The temperature is then raised while the mixture is agitated, to cause polymerization of the added monomer to occur.

Additional demineralized water is also added, as necessary, so that the material has the requisite characteristics for the kind of application intended. For example, for spraying, a solids content of about 19%–22% is a useful range to employ as the preferred solids content of the final product. Generally, a solids concentration in the range from 10% to 30% is useful for spraying, while for application techniques other than spraying, a solids content in the range from about 10% to about 40% or even more is useful. While the use of an aminoplast cross-linker is convenient, the products produced by the present invention are self cross-linking with heat.

The aqueous dispersions of the resinsous reaction products produced in accordance with the earlier-filed patent applications make excellent vehicles for facilitating the polymerization of additional quantities of ethylenically unsaturated monomer. It has been found that on a solids basis, for about 100 parts by weight of resinous reaction product in an aqueous dispersion produced in accordance with one of the patent applications described above, about $66\frac{2}{3}$ parts by weight of additional ethylenically unsaturated monomer can be added and polymerized in situ, while retaining the functionality and stability of the dispersion. In the process, it is generally useful to increase the water content of the dispersion, to facilitate handling and subsequent application properties. The dispersions obtained are generally useful as film-forming, surface coating materials.

The system that is being discussed is a rather complicated one. When the vehicle for the second stage (in situ vinyl) polymerization is an aqueous dispersion, produced in accordance with a process of one of the patent applications described above, ionized polymeric components are present in the dispersion. Currently available evidence as to characterization of the product after the in situ vinyl polymerization step supports the hypothesis that some additional grafting has occurred. Complete, accurate characterization of the product will require a good deal of work, due to the complexity of the processes and the ingredients.

The second stage product has good storage stability, and if sufficiently ionized, remains stable during storage without visible settling out of the particles and without the need for agitation. The appearance of the second stage reaction product, in aqueous dispersion, is opalescent, indicating that the solids present, or at least a part of them, are in the form of a dispersoid.

There are many advantages to modifying the first stage reaction product by supplementing its solids content through the second stage in situ vinyl polymerization. One obvious reason is economy, since generally, the ethylenically unsaturated material that is added in the second stage to the first stage reaction product, then polymerized, is less expensive than the epoxy component in the first stage. In addition, the amount of organic solvent as a percentage of the final product is substantially reduced, through the addition of more solids and more water during the second stage. Another important advantage is that the second stage supplementation can be carried out in the same reaction vessel in which the first stage product is produced. The second stage supplementation therefore does not require additional equipment, and in fact, makes more efficient use of existing manufacturing equipment because material of a greater solicontent can be produced, with less organic solvent, than is the case if only the first stage product is produced in the same equipment.

Based upon 100 parts of resinous reaction product solids in a first stage product, about 20 parts to 225 parts of added vinyl monomer represents a preferred range of addition. However, a greater amount may be added if desired, if appropriate steps are taken to compensate for the changed characteristics of the product, having in mind the intended end use. On the other hand, there is little point in going through the second stage addition unless a significant amount of monomer is added to the solids already present. While the currently practical minimum is about 20 parts of added monomer for each 100 parts of first stage solids, as little can be added as desired. The presently preferred range of addition is from 20 parts to 50 parts, for sprayable sanitary coating compositions.

In practice, a sufficient addition of monomer is made so that the solids added in the second stage contribute from about 10% to about 40%, and preferably, from about 20% to about 30%, of total solids in the final product, which can offer a material advantage in respect of economic considerations without substantial loss in functional properties, for can coatings produced in accordance with one preferred embodiment of the invention, as hereafter described.

In a variation, the resinous reaction product containing the graft polymer may be prepared utilizing an amine, so that the graft polymer and, depending on the process employed, the ungrafted addition polymer also, may be base-functional. In this case, inversion in water is accomplished by the addition of a fugitive acid that ionizes the amine groups. The resulting dispersion is then useful for the in situ vinyl polymerization step.

The Graft Polymer Resinous Reaction Product of the First Stage

The term "graft polymer resinous reaction product" is used to refer to the reaction mixture that is produced by the addition polymerization of ethylenically unsaturated (vinyl) monomer in the presence of an epoxy resin that has aliphatic backbone carbons having one or two hydrogens bonded thereto in the ungrafted state, in the presence of at least 3% benzoyl peroxide (BPO) or equivalent hydrogen-extracting initiator, based on monomer. It may be either acid-functional or base-functional.

This resinous reaction product is characterized as a mixture of unreacted epoxy resin and two associatively formed polymers. One of these polymers is the graft polymer, formed by carbon-to-carbon bonding of addition polymer to some of the aliphatic backbone carbons of the epoxy resin that generally are those having two hydrogens bonded thereto in the ungrafted state. The other polymer is addition (vinyl) polymer, formed from the monomer present, and not grafted.

A. Acid-Functional Product

The vinyl monomer may be a single monomer but preferably is a monomer mixture. To make an acid-functional product, ethylenically unsaturated acids, particularly acrylic acid and methacrylic acid, are preferred components. Styrene is a valuable monomer for use as a part of the monomer component, because it is economical and has other desirable properties. Ethylenically unsaturated acid esters are also useful, such as, for example, ethyl acrylate, butyl acrylate, the corresponding esters of methacrylic acid, and the like.

The ethylenically unsaturated acids include true acrylic acid and lower alkyl substituted acrylic acids, that is, those acids having ethylenic unsaturation in a position that is alpha, beta, to a single carboxylic acid group. The preferred acrylic acid is methacrylic acid.

The monomer component will preferably contain a major proportion of an acrylic acid, preferably methacrylic acid. When a styrenic monomer such as styrene is employed, it constitutes, ordinarily, a minor portion of the monomer component. For those coating compositions that may come in contact with food, and for the preparation of beverage can coating compositions in particular, one preferred addition polymerizable monomer mixture is made from 70 parts by weight of methacrylic acid to 30 parts by weight of styrene to 1 part by weight of ethyl acrylate. Another preferred monomer mixture includes methacrylic acid, styrene, and ethyl acrylate, in the approximate weight ratio of 65:34:1 respectively.

B. Base-Functional Product

The base-functional graft polymer resinous reaction product may be made by incorporating an amine in the graft polymer molecule. There are two preferred ways to do this.

First, an epoxy resin having epoxide groups available for reaction may be reacted with a primary or a secondary amine, preferably a secondary amine, thus introducing tertiary amine groups into the molecule.

Second, an unsaturated amine such as dimethylaminoethyl methacrylate may be incorporated in the monomer mixture that is used to form the graft polymer resinous reaction product.

C. Graft Polymer Process

To form the graft polymer resinous reaction product, the ethylenically unsaturated monomer component is addition polymerized in the presence of the epoxy resin component. Generally a solvent is employed that will dissolve all of the reactants and the reaction product, to facilitate handling, such as 2-butoxy-ethanol-1. However, the use of the solvent is not essential to permit the reaction to occur.

The epoxy resin may be an aromatic 1,2-epoxy diepoxide resin that has two terminal epoxy groups per molecule, that remain intact, such as a diglycidyl ether of bisphenol A. In this case, the initiator preferably is benzoyl peroxide at a concentration of at least 3% by weight of the monomer, and preferably 4% or more, and most preferably from 6% to 7%. Concentrations of benzoyl peroxide of 15% or higher based on monomer may be employed, but since this initiator is expensive, and since amounts of about 6% to 7% are adequate, there is no incentive to use larger amounts. With this particular initiator, the polymerization temperature may be in the range from about 110° C. to about 130° C., for practical reaction speeds. Temperatures outside this range obviously may be used. However, lower temperatures generate correspondingly lower reaction rates, while higher temperatures tend to promote undesirable side reactions. Other free radical initiators than benzoyl peroxide may be used, but it is preferred. Another preferred organic peroxide is t-butyl perbenzoate, and other peroxides include lauroyl peroxide, decanoyl peroxide, and caproyl peroxide.

The epoxy resin may be terminated to eliminate substantially all of the epoxy groups, by reaction with terminating agents such as the phenols, many of the carboxylic acids, primary and secondary amines, mercaptans, alcohols, and even water. A preferred terminating agent is bisphenol A. While some ethylenically unsaturated terminating agents can be used, generally it is preferred to avoid materials of this kind in order to avoid possible addition polymerization reactions with the addition polymerizable monomer, during grafting.

Saturated fatty acids and aromatic monocarboxylic acids such as benzoic acid are particularly useful for terminating a diepoxide resin without extending it, and are especially useful where they can impart desired properties. Ordinarily, when the fatty acids are used, they can be used in ordinary commercial form and need not be highly purified. Acids such as palmitic, lauric, myristic and stearic are very useful, either in refined form or as highly purified acids.

Generally the primary and secondary amines are satisfactory terminating agents, particularly hydroxyl amines such as, for example, ethanolamine and diethanolamine. There are indications that the presence of a hydrogen atom that is reactable with an epoxy group is preferable, and for this reason, among others, the tertiary amines are not considered to be suitable as terminating agents.

When the epoxy resin has been terminated, with the elimination of substantially all of the epoxy groups, there is no danger of an esterification reaction occurring between the epoxy resin and the ethylenically unsaturated carboxylic acid in the monomer component. Accordingly, higher reaction temperatures may be employed for the addition polymerization reaction, and a wider variety of initiators may be employed, requiring or permitting the use of a much broader range of reaction temperatures. For example, redox and persulfate catalyst systems may be employed. One redox initiator that may be employed is sodium formaldehyde sulfoxolate hydrate. A preferred persulfate is ammonium persulfate.

In the case where both the graft polymer and the associatively produced ungrafted addition polymer are acid functional, a convenient way to describe the acid functionality that is desired in the graft polymer resinous reaction product is to express it as the amount required, in the presence of an ionizing agent such as an amine, so that the entire resinous reaction product may be readily and stably dispersed in an aqueous vehicle. Expressed another way, both the graft polymer and the ungrafted addition polymer will contain carboxylic acid units. These units should constitute at least 5% by weight of the resinous reaction product, and preferably, about 10% by weight of the resinous reaction product. A preferred range of carboxylic acid units for the resinous product to be used in a sprayable sanitary coating is from about 20% to about 60% by weight of the monomer component, and preferably, from about 40% to about 50% by weight of the monomer component.

When the initial reaction mixture, from which an acid-functional graft polymer resinous reaction product is formed, is low in either epoxy resin or in ethylenically unsaturated acid, it is best to combine the weight percent of carboxylic acid units with a measurement of the Acid Number value for the resinous reaction product, based on non-volatiles. Also, since some carboxylic acid units may be consumed during the grafting reaction, as by ester formation with epoxide groups, a second measure of acid functionality provides a better indication of ionizing potential. One convenient measure is the Acid Number of the resinous reaction product, which should be in the range from 30 to 200, preferably from 45 to 150, and for sprayable sanitary coatings, generally from 70 to 90.

In the case where the graft polymer resinous reaction product is base-functional; a convenient indicator of ionizable potential is the tertiary amine nitrogen content, or the equivalent. A secondary amine nitrogen can be ionized also, but has less effect. A tertiary amine nitrogen can be ionized by an acid, such as hydrochloric lactic, or acetic acid, or by a quaternizing agent such as dimethyl sulfate. When the ionization is derived from quaternary nitrogen, a smaller nitrogen content is needed for the same result than is the case where the ionization is derived from tertiary amine nitrogen with an acidic ionizing agent.

For making a sprayable, water-reducible sanitary coating composition, the epoxy resin should have a molecular weight of at least 4,000 and may be up to 40,000 or so. The upper limit is imposed by handling considerations and not by technical feasibility. Generally an epoxy resin having an initial molecular weight of 8,000 to 12,000 will produce good results. While reference has been made to the molecular weight of the epoxy resin, which may be furnished by the supplier, it is common in the trade to refer to epoxy equivalent weight (EEW) rather than to molecular weight. For the preferred 1,2-epoxy, aromatic diepoxide resins generally used in the practice of preferred embodiments of the present invention, the EEW value is approximately equal to one-half of the molecular weight. The EEW value is conveniently determinable by running a % oxirane oxygen content titration. The epoxy resin preferably should amount to at least 50% and up to 90%, preferably 60% to 90%, and more preferably, from about 70% to about 80% by weight of the initial reaction mixture, dry solids basis.

For acid-functionality, the addition polymerizable monomer should preferably be predominantly methacrylic acid. It should be present in sufficient quantity to provide at least 6% of carboxylic acid units by weight of the resinous reaction product produced, and preferably, 6% to 8%, and most preferably, about 7%.

For base-functionality, the functionality may preferably be obtained by forming an amine adduct on the epoxide groups, or by grafting side chains on the epoxy backbone, or by a combination of both. Generally the use of just one of these is adequate to achieve the necessary ionizing capacity.

With a formulation specifically designed for use as a sanitary coating, such as a coating for a beer can, where the aromatic diepoxide resin constitutes from about 70% to about 80% by weight of the initial reaction mixture, and the balance comprises a monomer mixture of from about 60% to about 90% by weight of methacrylic acid, about 1% of ethyl acrylate, and the balance styrene, it is preferred to employ from about 6% to about 7% by weight, dry basis, of benzoyl peroxide as the initiator, with a reaction temperature in the range from about 110° C. to about 130° C., in a solvent or solvent system which facilitates handling.

The resinous reaction product, if acid-functional, may be dispersed in an aqueous vehicle with an ionizing agent, such as ethanolamine or dimethyl ethanolamine. The ionizing agent is a material that is driven off under the conditions of cure, and is therefore referred to as "fugitive".

Some representative first stage acid-functional dispersion compositions are as follows, in parts by weight.

TABLE 1

| Representative First Stage Dispersion Compositions | | | | | |
|---|---|---|---|---|---|
| Component | Parts By Weight | | | | |
| Epoxy resin EEW 4,000 | 95 | 75 | 60 | 37.5 | 12.5 |
| addition polymerizable | | | | | |

TABLE 1-continued

Representative First Stage Dispersion Compositions

| Component | Parts By Weight | | | | |
|---|---|---|---|---|---|
| monomer including an acrylic acid | 5 | 25 | 40 | 62.5 | 87.5 |
| 2-butoxy-ethanol-1 | 30.4 | 24 | 19 | 12 | 4 |
| n-butanol | 45.6 | 36 | 29 | 18 | 6 |
| dimethyl ethanol amine (ionizing agent) | 7.6 | 6 | 4.8 | 3 | 1 |
| demineralized water | 310 | 245 | 196 | 122.5 | 70 |
| Total | 493.6 | 411 | 348.8 | 255.5 | 181 |

The primary purpose of the first stage, for present purposes, is the production of an ionized graft polymer resinous reaction product. While this has been exemplified in Table 1 as a particular associatively-formed mixture of a graft polymer and an addition polymer, both of which are acid-functional, together with unreacted epoxy resin, all in an aqueous dispersion, ionized by the presence of a fugitive base, other highly ionized resins may be used as first stage products, for subsequent use in accordance with the present invention.

The use of an epoxy resin to form the backbone of the graft polymer is a preferred embodiment. The presence of unreacted epoxy resin, and the presence of the epoxy resin component of the graft polymer, lead to coating compositions that exhibit excellent properties with respect to wetting metal surfaces and adhesion to metal surfaces. Consequently, the presence of epoxy resin in the end product is advantageous for metal coating compositions. However, particularly where these properties are not necessary, useful first stage products can be produced by utilizing a resin other than an epoxy resin as the backbone component in a graft polymer that is ionizable. Other resins that can be used as the backbone component include those from vinyl chloride polymers and copolymers; acrylic resins both homopolymers and copolymers; hydrocarbon resins such as, for example, those from butadienes, styrenes, and coumarone-indenes; polyurethanes; polyesters; and generally any polymeric species which contains the requisite quantity of extractable hydrogen atoms on aliphatic carbons in a backbone chain. Alternatively, where the properties imparted by an epoxy resin are desirable, a sufficiently ionized other resin may be employed to maintain a dispersed epoxy resin in a stable aqueous dispersion, and this kind of coating composition is a preferred form of the present invention, because of the desirable characteristics imparted by the presence of the epoxy resin.

When an acid-functional or base-functional graft polymer resinous reaction product of the preferred sanitary coating composition embodiment of the invention is ionized in an aqueous dispersion, the dispersion is characterized by the presence of a great many very fine particles, often as small as 20 to 400 Angstrom units. The dispersion is usually characterized by extreme stability; that is, the solids do not separate out or segregate, and the dispersion retains its homogeneity almost indefinitely under ordinary storage conditions. The term "stable" is used herein to refer to a dispersion in which there is no material change in pH or viscosity, and no settling, after storage at room temperature for six months. Sprayable dispersions, prepared as described herein, generally can be sprayed without clogging or other mechanical problems. Because of the high epoxy resin content of dispersions prepared in accordance with preferred embodiments of the invention, adhesion to metallic surfaces is excellent, as is the initial wetting of such surfaces.

The Second Stage Products and Processes

In the second stage of a process carried out in accordance with one preferred embodiment of the present invention, the addition polymerization of added ethylenically unsaturated monomer is conducted in an aqueous dispersion of the graft polymer resinous reaction product from the first stage. Such a dispersion contains a high proportion of film-forming, cross-linkage, polymeric material that is highly ionized. The highly ionized material consists of the ionized graft polymer, and the ionized addition polymer (ungrafted). This ionized material can be compared, by analogy, to the use of a surfactant.

Addition polymerizable monomer is added to the first stage aqueous dispersion, together with a suitable initiator, and addition polymerization is carried out with the net effect of increasing the amount of solids present in the dispersion by creating added addition polymer in situ. The ionized graft polymer resinous reaction product is present as an ultrafine dispersion of very fine solid particles in the aqueous vehicle, and the in situ vinyl polymer formed by the second stage reaction appears to assume the same form. Typically, such dispersions are characterized by an opalescent appearance, indicating very fine particle sizes. Larger particle sizes would tend to produce a more milky or opaque appearance. In this second stage operation, there is wide flexibility as to the kinds of initiator that may be employed and the reaction temperature.

If in the first stage, 80 parts of epoxy resin are reacted with 20 parts of a monomer mixture consisting of a major amount of methacrylic acid and a minor amount of styrene, reacted at about 115° C. to 120° C. and in the presence of about 7% BPO, dry basis, then the graft polymer resinous reaction product will contain about 50% to 56% by weight of graft polymer, about 7% to 10% by weight of ungrafted but ionizable addition polymer, and from about 38% to about 40% of unreacted epoxy resin. If then, for example, 15 to 50 parts of ethylenically unsaturated monomer, such as styrene or styrene plus methacrylic acid and/or ethyl acrylate, are subjected to addition polymerization conditions in the presence of 75 parts by weight of an aqueous dispersion at 22.5% N.V. of this acid functional graft polymer resinous reaction product, the added ethylenically unsaturated monomer adds to the content of the polymer solids present, while much of the functionality of the original dispersion is preserved. The second stage dispersion that is produced will contain about 13.5 parts by weight of solids derived from epoxy resin, and about 3.4 parts derived from first stage monomer material, and 15 to 50 parts derived from second stage ethylenically unsaturated monomer material.

At this time it is not certain how the added ethylenically unsaturated monomer exists in the final product. However, it is known that the second stage product, while increased in total solids content, remains a stable dispersion and possesses, generally, the essential functional characteristics of the first stage aqueous dispersion product, which may however be modified to some degree. For ease in handling, and for application properties, water may be added during the second stage reaction, so that while the solids are increased as to total amount, the solids concentration may remain substantially constant.

Obviously, changes in the proportions or nature of the materials employed will affect the composition and properties of the second stage product.

The variety of compositions that can be custom produced in accordance with the present invention can be illustrated by the data in Tables 2 and 3, below. In Table 2, the component providing the source of each type of solids in the second stage product is reported by weight, on a dry solids basis, in both parts and percentages, assuming that 10% of the total solids in the second stage product are added in the form of second stage addition polymerization monomer. In Table 3, it is assumed that the added second stage addition polymerizable monomer provides 40% by weight of the solids content of the second stage product.

TABLE 2

Representative Second Stage Product Compositions (By Weight, Dry Solids Basis) 10% Solids Added in the Second Stage

| Component Providing Source of Solids | Parts | % | Parts | % | Parts | % | Parts | % | Parts | % |
|---|---|---|---|---|---|---|---|---|---|---|
| Epoxy | 95 | 86.4 | 80 | 72.7 | 50 | 45.5 | 30 | 27.3 | 5 | 4.5 |
| First Stage Addition Polymerizable Monomer | 5 | 4.5 | 20 | 18.2 | 550 | 45.5 | 70 | 63.6 | 95 | 86.4 |
| Second Stage Addition Polymerizable Monomer | 10 | 9.1 | 10 | 9.1 | 10 | 9.1 | 10 | 9.1 | 10 | 9.1 |
| Total Total | 110 | 100. | 110 | 100. | 110 | 100 | 110 | 100. | 110 | 100 |

TABLE 3

Representative Second Stage Product Compositions (By Weight, Dry, Solids Basis) 40% Solids Added in the Second Stage

| Component Providing Source of Solids of; | Parts | % | Parts | % | Parts | % | Parts | % | Parts | % |
|---|---|---|---|---|---|---|---|---|---|---|
| Epoxy | 95 | 57 | 80 | 48 | 50 | 30 | 30 | 18 | 5 | 3 |
| First Stage Addition Polymerizable Monomer | 5 | 3 | 20 | 12 | 50 | 30 | 70 | 42 | 95 | 57 |
| Second Stage Addition Polymerizable Monomer | 66 | 40 | 66 | 40 | 66 | 40 | 66 | 40 | 66 | 40 |
| Total | 166 | 100 | 166 | 100 | 166 | 100 | 166 | 100 | 166 | 100 |

Those compositions having 50% or more of total solids contributed by the initial epoxy resin component wet and adhere exceptionally well to metal surfaces. Since the epoxy resins are well known for having poor resistance to weathering, the addition polymerizable monomer can improve these and other characteristics of the composition. Where economy is important, or for application to surfaces other than metal, valuable compositions can be prepared with a relatively small contribution from the epoxy resin. The graft polymer per se appears to contribute importantly to the properties of any composition containing it, even in relatively small amount.

The invention will now be further demonstrated in the following examples which describe specific processes and products. Throughout this application, all parts and percentages are by weight, and all temperatures are in degrees C, unless expressly indicated to be otherwise.

EXAMPLE 1

Production of Dispersed Product Containing Approximately 40% by weight of Styrene Solids Added in the Second Stage, Based on Total Solids; Epoxy Content, about 45% of Solids First Stage: Dispersion of Graft Polymer Resinous Reaction Product A graft polymer resinous reaction product is prepared having its solids content derived from an initial raw material comprising about 75% epoxy resin and about 25% ethylenically unsaturated monomers. The graft polymer resinous containing reaction product is prepared in the following manner.

4,223 lbs. of an aromatic epoxy resin having an epoxy equivalent weight of 5,300 and a viscosity of $Z_2$-$Z_3$ (40% in 2-butoxy-ethanol-1) and containing 100 lbs. of xylene is mixed in an agitated reactor with a solvent system made up of 1,155 of 2-butoxy-ethanol-1 and 2,252 lbs. of n-butanol. Mixing is continued while the epoxy resin is brought to 240° F.–245° F. (115° C.–118° C.), with nitrogen sparging.

In a separate vessel, the following are charged, to form a mixture:

| | |
|---|---|
| methacrylic acid | 878 lbs |
| styrene | 460 lbs |
| ethyl acrylate | 14 lbs |
| benzoyl peroxide (BPO) | 115 lbs (as is basis, 78% active, in water) |

| -continued | |
|---|---|
| 2-butoxy-ethanol-1 | 347 lbs |

The BPO amounts to about 6.6% by weight of the total monomer present. The monomers are thoroughly mixed, then the mixture is gradually added to the reactor containing the epoxy resin, at a uniform rate, over a period of about three hours, while maintaining an essentially constant temperature. The reactor contents are then held at 240° F.–245° F. (115°–118° C.) for about three hours. The reaction mixture is then cooled to 210° F. (85° C.). This reaction product (about 9,444 lbs.) is referred to hereafter as RP 1-1.

During the three hour hold period, the following are charged to a mixing tank:

| demineralized water | 9,564 lbs. |
|---|---|
| 2-butoxy-ethanol-1 | 524 lbs. |
| dimethyl ethanolamine | 377 lbs. |

After thorough mixing and heating to about 120° F., 7,810 lbs of RP 1-1 is added to it, to form an aqueous dispersion referred to hereafter as RP 1-2 (about 18,275 lbs.).

The resinous reaction product (RP 1-1) is a mixture formed from the addition polymerization of 1,352 parts by weight of the mixture of addition polymerizable monomers in the presence of 4,113 parts by weight, approximately, of the epoxy resin, and in the presence of about 6.6% by weight of BPO initiator based on total monomer. This amount is far above that used for ordinary addition polymerizations, and is effective simultaneously to cause carbon-to-carbon grafting of addition (vinyl) polymer to the aliphatic backbone carbons of the epoxy resin and addition (vinyl) polymerization of the monomer. The grafting is believed to be due to the hydrogen extracting ability of the BPO at the reaction temperature employed.

The reaction product RP 1-1 has three solids components, namely:

1. unreacted modified epoxy resin;
2. a graft polymer in which addition polymer is grafted to aliphatic backbone carbon atoms of the epoxy resin that have either one or two hydrogens bonded thereto in the ungrafted state; and
3. (ungrafted) addition polymer.

Separation of the respective RP 1-1 solids components from the RP 1-1 mixture is very difficult, and is accomplished by solvent partition and other techniques.

Both the graft polymer and the addition polymer present in RP 1-1 are acid functional by reason of their large respective contents of methacrylic acid. They both are therefore susceptible to ionization, in the proper environment, and become ionized upon the addition of the amine in the water-solvent vehicle to form the RP 1-2 dispersion. The ionization is sufficient in extent that the RP 1-2 solids can be characterized as dispersoid in nature. The particles are visible in their liquid vehicle, although generally none is above one micrometer in its largest dimension. The dispersion is opalescent. It remains stable over a period of many months at room temperature, without any need for agitation to redistribute the particles.

The Acid Number of RP 1-2 on a solids basis (on nonvolatiles, i.e., NV) is about 104. The Base No. (mg. of KOH/gm. of solids) is about 53.2 (NV). Viscosity is 72 seconds as measured in a #4 Ford cup at 25° C. N.V. content is about 24.7%.

Second Stage; Incorporation of More Addition Polymer in the RP 1-2 Product

In this second stage, the dispersion of the graft polymer resinous reaction product from the first stage serves as the polymerization medium for an added amount of an ethylenically unsaturated monomer, styrene. The added styrene amounts to about 39.6% by weight of the total solids of the second stage reaction mixture product.

A portion of the reaction product from the first stage (RP 1-2) is placed in a reactor with other ingredients in the following proportions:

| Ingredient | Parts by Weight |
|---|---|
| RP 1-2 | 1,440 (403.3 parts solids) |
| demineralized water | 1,220 |
| dimethyl ethylamine | 30 |
| 2-butoxy-ethanol-1 | 70 |

The reactor contents are heated to 80° C. with mild agitation and with a nitrogen sparge.

A mixture is made up of 240 parts of styrene and 12 parts (as is) of wet benzoyl peroxide (78% BPO dry basis). The mixture is added to the reactor at a uniform rate, while the temperature is maintained at 80° C. over a period of one hour. The reactor is then held for 3 hours at 80° C., with the mild agitation continuing, then cooled.

The reaction product mixture (RP 1-3) contains about 19.6% non-volatiles (N.V.) in 3,012 lbs. of product; has a viscosity of 28 seconds as determined by a No. 4 Ford cup at 25° C.; a Base No. (NV) of 66.2; and an Acid Number (NV) of 68. The RP 1-3 product is a dispersion of very fine particles in an aqueous vehicle. This dispersion is storage-stage over very long periods of time. Its polymeric solids are derived about 45% from the epoxy resin, and about 55% from ethylenically unsaturated monomer.

The styrene added in the second stage constitutes 40.3% of total solids by weight. The ratio of organic solvents to solids is about 0.6 to 1.

The RP 1-3 product is useful directly, as a clear, water-based varnish. It is also useful as a clear spray coating for metal surfaces, being curable on heating to drive off the liquid vehicle. Upon addition of from about 5% to 14% by weight, dry solids basis, of Cymel 303 aminoplast (a hexamethoxymethyl melamine resin), or other suitable cross-linker, a coating composition is obtained that is useful for a variety of applications.

When sprayed on the metal surface of a can interior, the film blistered upon application at a rate of 140 mg/can. Coverage was attained at 130 mg. per can, with an enamel rater test of 75.

Essentially the same results are obtained if, instead of starting with an epoxy resin of the desired epoxy equivalent weight, one of lower epoxy equivalent weight is procured and advanced by reaction with bisphenol A. For example, a liquid epoxy resin such as Dow Chemical's DER 333 can be advanced with bisphenol A and a suitable catalyst, to produce an epoxy resin of suitable epoxy equivalent weight. It then goes through the first and second stage reactions in the same manner as though procured at the desired degree of advancement.

EXAMPLE 2

Coating Composition where the Second Stage Styrene added is about 23% by Weight of Total Solids; Epoxy Content, 58% of Solids First Stage: Dispersion of Graft Polymer-Reaction Product For the first stage product, the aqueous dispersion product from the first stage of Example 1 (RP 1-2) is employed.

Second Stage: Product Obtained with Less Added Styrene

A reaction flask is charged with 1,848 parts by weight of the aqueous dispersion product from the first stage of Example 1 (RP 1-2) (456.4 parts of polymer solids). To the flask also is added 1,012 parts by weight of demineralized water, and 23 parts by weight of dimethyl ethanol amine.

The contents of the flask are subjected to continuous agitation and gradually brought to a temperature of 80° C., during which the flask is sparged with nitrogen. When the 80° C. temperature is attained, a previously prepared mixture of 138 parts by weight of styrene and 7 parts by weight of benzoyl peroxide is added over a period of 1 hour. The benzoyl peroxide is wet, containing 78% active benzoyl peroxide by weight, and amounts to about 4% by weight, dry basis, based on the styrene. When the addition has been completed, the contents of the flask are held at 80° C. for 3 hours with mild agitation, then cooled.

The final product (RP 2-1) contains 19.6% by weight non-volatiles, and has a viscosity of 20 seconds as measured on a No. 4 Ford cup at 25° C. (77° F.). The Acid Number (N.V.) is 84, and the Base Number (N.V.) is 69. The polymeric solids in the RP 2-2 product are derived about 57.8% from the epoxy resin and about 42.4% from ethylenically unsaturated monomer. The styrene added in the second stage constitutes about 23.2% by weight of total solids.

This product is useful as a water-reducible spray coating for applying a fine, unpigmented finish to metal surfaces. It can be applied as is and permitted to dry, or it can be force-cured by heating it. Pigments and cross-linking agents may be added as desired.

EXAMPLE 3

Coating Composition Produced in Two Stages Where the Second Stage Styrene Contributes about 30% of Solids; Epoxy Content, about 56% of Solids First Stage: Dispersion of Graft Polymer Resinous Reaction Product In this procedure, 18,099 lbs. of essentially the same epoxy resin as in Ex. 1 are charged to the reactor. In this case the resin contains 482 lbs. of xylene. As in Ex. 1, the mixture is sparged with nitrogen and formed into a mixture with 5,073 lbs. of 2-butoxy-ethanol-1 and 8,725 lbs. of n-butanol. The mixture is brought to a temperature in the range from about 240° F. to 245° F. (about 115° C.–118° C.).

In a separate weigh tank, a mixture is made of the following:

| Ingredients | Parts by Weight |
| --- | --- |
| methacrylic acid | 2,997 lbs. |
| styrene | 1,565 lbs. |
| ethyl acrylate | 40 lbs. |
| wet benzoyl peroxide (78% dry basis) | 400 lbs. |
| 2-butoxy-ethanol-1 | 1,170 lbs. |

These materials are mixed well and the Acid Number of the mixture is checked to make sure that it is within the expected value of from about 417 to about 429.

With the contents of the reactor at a temperature in the range from about 240° F. to 245° F. (about 115° C.–118° C.), and while mixing, the addition of the monomer mixture is initiated and continued for about 2 hours, at a uniform rate of about 45 lbs. per minute, with the agitation continuing. When this addition has been completed, the lines from the monomer mixture tank to the reactor are rinsed by flushing them into the reactor with 650 lbs. of n-butanol. The contents of the reactor are then held at the 240° F.–245° F. (about 115° C.–118° C.) temperature for about 3 hours. At the end of this time, the viscosity is K-R, in 1/1, resin/m-pyrol (N-methyl-pyrrolidone). The non-volatiles are in the range from about 56% to about 60%, preferably 58.5%. Acid Number (N.V.) is about 81–85, preferably 83, and percent oxirane oxygen (N.V.) is about 0.1–0.3, preferably 0.2.

During the three hour period in the reactor, a reducing tank is loaded with 5,580 gallons of demineralized water (46,488 lbs.). Then, 2,182 lbs. of dimethyl ethanol amine and 2,762 lbs. of 2-butoxyethanol-1 are added to the water in the reducing tank.

The contents of the reactor are then transferred to the reducing tank over a period of 30 to 45 minutes, with continued heating. The contents are then held with agitation for about a half-hour, and then an additional quantity of demineralized water, 922 gallons (7,672 lbs), is added to the reducing tank, and the contents of the reactor are cooled to the range from 90° F. to 100° F. (about 32°–38° C.), to provide the product RP 3-1. At this point, the weight per gallon of the product, RP 3-1, should be about 8.4 to 8.6 lbs., preferably 8.5 lbs., with a nonvolatiles content of about 21.5% to 23.5%, preferably about 22.5%. The viscosity as determined in a No. 4 Ford cup at 25° C. (77° F.) should be in the range from 50 to 60, and the pH should be in the range from 7.2 to 7.4, preferably 7.3. The Base Number (N.V.) should be in the range from about 57 to 63, preferably about 60. The Acid Number (N.V.) is about 85.

The epoxy resin contributes about 80% by weight to the polymeric solids of the reaction product, and the addition polymerizable monomers, about 20% (considering just these two components).

The reaction product RP 3-1 has three solids components, namely:
1. unreacted modified epoxy resin, about 38% by weight of total solids;
2. graft polymer in which addition polymer is grafted to aliphatic backbone carbon atoms of the epoxy resin that have either one or two carbons bonded thereto in the ungrafted state, about 50% by weight of solids in RP 3-1; and
3. (ungrafted) addition polymer, about 12% by weight of the RP 3-1 solids.

The percentage figures reported above for the respective RP 3-1 solids components are approximations based on solvent partition and other analytical techniques.

Second Stage: Coating Composition Product

A reactor flask is charged with 2,364 parts by weight of the reaction product (RP 3-1) produced from the first stage above. The flask contents are heated to about 80° C.

In a separate vessel, a mixture is made of 228 parts by weight of styrene and 12 parts by weight of benzoyl peroxide, as is, wet (78% strength). This mixture is then added to the flask containing the reaction product from the first stage over a period of about 1 hour, while maintaining the temperature at about 80° C. Thereafter, the reactor flask is maintained at 80° C. for about 3 hours, with gentle agitation. During the hold period a mixture is made of the following ingredients, in parts by weight:

| Ingredients | Parts by Weight |
| --- | --- |
| dimethyl ethanol amine | 20 |
| 2-butoxy-ethanol-1 | 207 |
| demineralized water | 969 |

At the end of the hold period, this aqueous mixture is added to the reaction product in the agitated reaction flask and the contents are thoroughly mixed and cooled. The resulting dispersion contains about 20.5% by weight nonvolatiles, has a viscosity of about 21 seconds as measured on a No. 4 Ford cup at 25° C. (77° F.), and an Acid Number (N.V.) of 62. The polymeric solids in this reaction product are derived, by weight, about 70% from the first stage material, and about 30% from the styrene added in the second stage. The product is useful for protective surface coating applications of a variety of kinds.

EXAMPLE 4

Second Stage, Added Styrene to Contribute About 15% by Weight of the Total Solids in the Final Reaction Product Second Stage Polymerization A reaction flask is charged with 2,871 parts by weight of a reaction product (RP 3-1) produced in accordance with the process described in the first stage of Example 3 above, having a non-volatiles content of 22.5%, together with 26 parts by weight of dimethyl ethanol amine. This is heated to 80° C. over a period of about 1 hour.

115 parts of styrene and 9 parts, as is basis, of wet benzoyl peroxide (78% dry basis), are then added to the flask. This amount of BPC is 6% by weight based on the weight of the styrene. This addition is made as a transfer over a period of about 1 hour, at 80° C., and upon completion of the addition, the flask is held, with agitation, for about 2 hours at 80° C. After that hold period, the temperature is raised to 90° C. and held there for about 3 hours, then cooling is initiated and 819 parts by weight of demineralized water is added.

The final product has a viscosity of 30 seconds as measured on a No. 4 Ford cup at 25° C. (77° F). The Base Number (N.V.) is 73.7, and the Acid Number (N.V.) is 85. Second stage added styrene contributes about 15% of total solids in the final product, the remainder coming from the first stage material. This is an excellent coating composition, easily applied by spraying, and curable upon heating to a temperature of about 300° C.

EXAMPLE 5

Coating Composition Produced Using a Water-Soluble Redox Initiator System

Second Stage Polymerization

A reaction flask is charged with 6,980 parts by weight (22.5% N.V.) of a reaction product (RP 3-1) produced in accordance with the process described in the first stage of Example 3, together with 271 parts by weight of styrene. Agitation is initiated to insure thorough mixing, and the flask is sparged for about a half hour with nitrogen. The temperature is then raised to 30° C., and when this temperature is attained, a previously prepared mixture is added to the flask, containing 2.4 parts by weight of sodium sulfoxylate formaldehyde in 21 parts by weight of demineralized water. The agitation is continued for two minutes, then a previously prepared mixture is added, containing 2.6 parts of t-butyl hydroperoxide in 20.5 parts of demineralized water. The agitation is then continued for about 10 minutes, and then the temperature is raised to 70° C. and the contents of the flask are held at that temperature for about 3 hours.

At the end of this hold period, a previously prepared mixture is added to the flask, of 62 parts of dimethyl ethanol amine and 1700 parts of demineralized water. The contents of the flask are then cooled to permit recovery of the coating composition.

At this point, the composition has a non-volatiles content of 20.6% by weight, and a viscosity of 83 seconds as measured on a No. 4 Ford cup at 25° C. (77° F.). The Acid Number (N.V.) of the reaction product is 72. The Base Number is 79. The polymeric solids content is derived from about 72% of epoxy resin and ethylenically unsaturated monomer, about 28%, with the second stage added styrene contributing about 15% of total solids.

While this composition forms an excellent spray coating and may be cured at 300° C.–320° C., it may be further formulated by the addition of a cross-linking agent and pigment, as desired. It produces excellent protective coatings on metal surfaces.

EXAMPLE 6

Coating Composition Produced by a Redox System Where the Added Ethylenically Unsaturated Monomer is a Mixture of Styrene and Methacrylic Acid Second Stage Polymerization A reaction flask is charged with 2,793 pounds of a reaction product produced in accordance with the process described in the first stage of Example 3, RP 3-1 (22.5% N.V.), together with 100 parts by weight of styrene and 15 parts by weight of methacrylic acid. These materials are mixed in the reaction flask for about 30 minutes, during which a nitrogen sparge is maintained.

After the ingredients are thoroughly mixed, the temperature is raised to 30° C. At that time, 1.0 parts by weight of sodium sulfoxylate formaldehyde and 9 parts by weight of demineralized water are added to the reaction flask. The contents of the flask are then held for two minutes, and then 1.1 parts by weight of 90% tertiary butyl hydroperoxide and 8.7 parts by weight of demineralized water are added. The temperature is permitted to rise for about 10 minutes until the contents of the reaction flask are at about 70° C., and then they are held at that temperature for about two hours.

After the two hour holding period, there are added to the flask 22 parts by weight of dimethyl ethanol amine and 865 parts by weight of demineralized water. The contents of the reaction flask are mixed thoroughly and permitted to cool at 30° C.

The product contains 20.26% by weight of non-volatiles, and has a viscosity of 19 seconds as measured on a No. 4 Ford cup at 25° C. The Base Number (N.V.) is 53, and the Acid Number (N.V.) is 85.

This product is characterized by the fine particle size of its solids content, and by its great stability upon storage. The small amount of methacrylic acid added during the second stage polymerization results in an acid functionality that is ionized by the presence of the subsequently added amine.

The second stage monomer contributed about 15% of total solids present in the final product, with about 13% being furnished by the styrene and 2% by the methacrylic acid. Spray application properties of this product were good, comparable to those of the RP 3-1 product itself (which are considered to be excellent).

EXAMPLE 7

Redox System Polymerization; Higher Methacrylic Acid Content Than Ex. 6

Second Stage Polymerization

A reaction flask is charged with 2,793 parts by weight of an RP 3-1 product (22.5% N.V.); 77 parts by weight of styrene; and 38 parts by weight of methacrylic acid. The contents of the flask are mixed and sparged with nitrogen for ½ hour. The temperature is then raised to 30° C.

There are then added to the flask 1.0 parts by weight of sodium sulfoxylate formaldehyde and 9.0 parts by weight of demineralized water. After two minutes of agitation, there are added to the flask 1.1 parts of tertiary butyl hydroperoxide and 8.7 parts of demineralized water. After 10 minutes of agitation, the temperature is raised to 70° C. and held at that level for two hours.

Finally, there are added to the flask 22 parts by weight of dimethyl ethanol amine and 865 parts by weight of demineralized water. The contents of the flask are permitted to cool and the product is evaluated.

The product has an Acid Number of 103 N.V., a Base Number of 75 N.V., a viscosity of 13 seconds as measured on a No. 4 Ford cup at 25° C., and contains 19.2% by weight non-volatiles. The product is a stable dispersion of a very fine particles in an aqueous vehicle. It is useful as a clear coating material, with particularly good affinity for metal surfaces. When formulated with a suitable crosslinker, it makes a useful spray coating for application to cans. Application properties were not as good as those of the product of the preceding Example.

The second stage methacrylic acid addition contributed about 5% of the polymeric solids, and the second stage styrene addition, about 10%.

EXAMPLE 8

Redox System, Using Added Butyl Acrylate and Styrene

Second Stage Polymerization

A reaction flask is charged with 2,793 parts of an RP 3-1 product, 77 parts of styrene, and 38 parts of butyl acrylate. The flask is then stirred for ½ hour with nitrogen sparging. The temperature is then raised to 30° C., and there are added 1.0 parts of sodium sulfoxylate formaldehyde and 9.0 parts of demineralized water.

After mixing for two minutes, there are also added to the flask 1.1 parts of tertiary butyl hydroperoxide and 8.7 parts of demineralized water. After stirring for about 10 minutes, the temperature is raised to 70° C., then held for two hours at that temperature. At that time, 22 parts of dimethyl ethanol amine and 865 parts of demineralized water are added, and the contents of the flask are cooled.

This product consists of 19.9% non-volatiles and has a viscosity of 63 seconds as measured by a No. 4 Ford cup at 25° C. The Base Number (N.V.) is 71 and the Acid Number (N.V.) is 74, both based on non-volatiles. Through the second stage addition, the second stage styrene contributes about 10% to the weight of the polymeric solids, and the butyl acrylate contributes about 5%.

This product is less highly ionized than that of Example 7. It also consists of a suspension of very fine particles of polymeric materials in an aqueous vehicle, characterized by great storage stability. The composition is useful as a clear surface coating for a variety of substrates, and can be baked and thus cured. It formulates readily with pigments to provide pigmented coating compositions.

EXAMPLE 9

Second Stage Addition of Methacrylic Acid and Butyl Acrylate Redox System with Potassium Persulphate Second Stage Polymerization A reaction flask is charged with 2,793 parts of an RP 3-1 type product, together with 23 parts of methacrylic acid and 92 parts of butyl acrylate. The contents of the flask are stirred for ½ hour with a nitrogen sparge, and then the temperature is raised to 70° C.

There are then added to the flask 0.5 parts of potassium persulfate and 19.5 parts of demineralized water. The contents of the flask are then held for two hours at 70° C. with mixing. At that time, 1.0 parts of sodium sulfoxylate formaldehyde (a reducing agent), and 9.0 parts of demineralized water are added to the flask. After two minutes of mixing, 1.1 parts of 90% tertiary butyl hydroperoxide and 8.7 parts of demineralized water are added, and the flask contents are mixed and held for two hours at 70° C. Twenty-two parts of dimethyl ethanol amine and 845 parts of water are then added, the contents are carefully mixed, and cooled at 30° C.

This reaction product contains 18.7% non-volatiles and has a viscosity of 20 seconds as measured on a No. 4 Ford cup at 25° C. The Base Number is 74.3 and the Acid Number is 92, both N.V. Of the polymeric solids in the final product, the butyl acrylate added in the second stage contributed about 12% and the methacrylic acid, about 3%.

EXAMPLE 10

Redox System Polymerization; With Cross Linker

Second Stage

A reaction flask is charged with 2,589 parts of a reaction product (RP 3-1 type), 23.56% NV. To this is added 95 parts of styrene, 20 parts of methacrylic acid, and 38 parts of Cymel 303 aminoplast as a crosslinker. These materials are mixed with nitrogen sparging for ½ hour. The temperature of the contents of the reaction flask is then raised to 30° C.

At this point, 1.0 parts of sodium sulfoxylate formaldehyde and 9.0 parts of demineralized water are added. The flask contents again are mixed for about two minutes, then 1.1 parts of 90% tertiary butyl hydroperoxide and 9.0 parts of demineralized water are added. While mixing, the contents of the flask are held 10 minutes, then heated to 70° C. and are held at this temperature for three hours.

After the holding period, 37 parts of dimethyl ethanol amine and 1025.9 parts of demineralized water are added, and the contents of the flask are permitted to cool.

The reaction product produced in this manner has a non-volatiles content of 18.7%, and a viscosity of 21 seconds as measured on a No. 4 Ford Cup at 25° C. On non-volatiles, the Base Number is 83.7 and the Acid Number is about 85. Of the polymeric solids in the final product, the derivation was approximately as follows: RP 3-1 type starting material, 80%; styrene, 12.4%; methacrylic acid, 2.6%; aminoplast, 5%.

This product makes an excellent coating composition for spray application and curing by baking. Shelf stability is excellent.

EXAMPLE 11

Similar To Example 10; Different Proportions and Pre-Cross-linker, 1% of Second Stage Monomers Second Stage A reaction flask is charged with 2,545 parts of a reaction product (RP 3-1 type) having a nonvolatiles content of 22.4%. To this is added two parts of trimethylol propane trimethacrylate, 163 parts of styrene, 25 parts of methacrylic acid, and 277 parts of demineralized water.

These materials are mixed with nitrogen sparging for ½ hour. The temperature of the contents of the reaction flask is then raised to 50° C., and then there are added two parts of sodium sulfoxylate formaldehyde and 20 parts of demineralized water, and 2 parts of t-butyl hydroperoxide in 20 parts of demineralized water. The temperature is then raised to fall within the range from 75° C. to 80° C., and is held in that range for about 3 hours. The contents of the flask are then permitted to cool.

The reaction product produced in this manner has a non-volatile content of 24.7%, and a viscosity of 25 seconds as measured on a No. 4 Ford cup at 25° C. The Acid Number (N.V.) is 87.3.

Coating compositions produced in this manner make excellent clear coatings upon application to wood surfaces, and are particularly useful for indoor applications. The composition prepared in accordance with this example exhibited excellent flow characteristics. Upon drying, the film formed was somewhat brittle, indicating that it would not be particularly useful for application to metal surfaces, but that a different cross-linking material probably would overcome this difficulty. When used as a dip coating for hot water tanks, compositions prepared in accordance with the present example are characterized by high performance. Coatings produced in the manner of the example exhibit the characteristics of a pre-cross-linked resin, and so are especially useful in applications where air drying or low temperature curing must be used.

EXAMPLE 12

Greater Proportion of Pre-Cross-Linker than Example 11; 10% of Second Stage Monomer Second Stage A reaction vessel is charged with 2,545 parts of the same graft polymer resinous reaction product employed in Example 11. There are then added to the flask 19 parts of trimethylol propane trimethacrylate, 146 parts of styrene, 25 parts of methacrylic acid, and 277 parts of demineralized water. The contents of the flask are sparged with nitrogen for one-half hour then heated to 50° C.

There are then added to the flask two parts of sodium sulfoxylate formaldehyde in 20 parts of demineralized water, and 2 parts of t-butyl hydroperoxide in 20 parts of demineralized water. The temperature is then raised to within the range of 75° C. to 80° C., and held for three hours. The contents of the reaction flask are then permitted to cool.

The product has an NV of 24.4; a viscosity of 15 seconds as measured on a No. 4 Ford cup at room temperature; and an NV Acid Number of 87.

This coating composition is useful in the same way as the composition of Example 10, and because of the higher content of cross-linker, exhibits, after curing, somewhat greater brittleness.

EXAMPLE 13

Still Greater Amount of Pre-Cross-Linker; 50% of Second Stage Monomer

Second Stage

The reaction flask is again charged with 2,545 parts of the same graft polymer resinous reaction product employed in the previous two examples. To it are added 95 parts of trimethylol propane trimethacrylate, 70 parts of styrene, 25 parts of methacrylic acid, and 277 parts of demineralized water. The contents of the flask are then sparged with nitrogen for ½ hour.

The temperature is then raised to 50° C., and there are then added to the flask 2 parts of sodium sulfoxylate formaldehyde and 20 parts of demineralized water, and 2 parts of t-butyl hydroperoxide in 20 parts of demineralized water. The temperature is then raised to within the range of from 75° C. to 80° C., and held for three hours. After the holding period, the contents of the flask are permitted to cool to room temperature.

The final product contains 25% NV, has a viscosity of 25 seconds as measured in a No. 4 Ford cup at room temperature, and an Acid Number (NV) of 85.4.

The coating composition of this example has use in all the applications for which the composition of Example 11 is useful, but forms films that are even more brittle than those produced by the compositions of the earlier examples, because of the higher content of cross-linker.

EXAMPLE 14

Even Greater Amount of Pre-Cross-Linker; 87% of Second Stage Monomers

Second Stage

The reaction flask was again charged with 2,545 parts of the same graft polymer resinous reaction product employed in the preceding 3 examples. To it are added 165 parts of trimethylol propane trimethacrylate, 25 parts of methacrylic acid, and 277 parts of demineralized water. After sparging with nitrogen for ½ hour, the temperature is raised to 50° C. There are then added to the flask 2 parts of sodium sulfoxylate formaldehyde in 20 parts of demineralized water, and 20 parts of t-butyl hydroperoxide in 20 parts of demineralized water. The contents of the flask are then heated to raise the temperature within the range from 75° C. to 80° C., and are held in that temperature range for about 3 hours. The flask contents are then permitted to cool to room temperature.

The coating composition produced by this example has a non-volatile content of 25.2%, a viscosity of 16 seconds as measured in a No. 4 Ford cup at room temperature, and an NV Acid Number of 83. The composition is generally useful in the same applications as the compositions of the preceding three examples, but films formed from it are highly brittle.

General

The four preceding examples demonstrate the modifications in coating composition characteristics that are obtainable through the use of increasing proportions of a pre-cross-linker relative to total second stage ethylenically unsaturated monomer. Thus, the percentage of pre-cross-linker based on second stage added monomer can be summarized as follows:

| | | |
|---|---|---|
| | Example 11 | 1% |
| | Example 12 | 10% |
| | Example 13 | 50% |
| | Example 14 | 87% |

Increasing the proportion of the pre-cross-linker tends to enhance the brittle characteristics of the coating.

EXAMPLE 15

Procedure Similar to That of Example 3, for Process Comparison with the Following Two Examples Second stage A reaction vessel is charged with 3,330 parts of a product produced in accordance with the general procedure described in the first stage of Example 3, having 22.5% NV, together with 388 parts of demineralized water. The flask is then sparged for 30 minutes with nitrogen.

There is then added to the flask 3 parts of sodium sulfoxylate formaldehyde in 27 parts of demineralized water, and the contents of the flask are then heated to 80° C. Over a period of two hours, a mixture is then added to the flask, by a dropwise or other very gradual addition procedure. The mixture consists of 216 parts of styrene, 33 parts of methacrylic acid, and 3 parts of t-butyl hydroperoxide. After all of this mixture has been added, the contents of the reaction vessel are held at 80° C. for 3 hours, then permitted to cool.

The final product contains 24.4% non-volatiles, has a viscosity of 14 seconds as measured on a No. 4 Ford cup at room temperature, and an Acid Number (NV) of 85.

This composition is generally useful as a coating, and may be applied in many convenient ways. Heat curing is effective.

EXAMPLE 16

Use of a 10% Monomer Heel

Second Stage

As in the preceeding example, 3,330 parts of the same 22.5% NV product as in Example 15 are charged into a reaction flask. This time, however, a "heel" of monomer is placed in the flask with the epoxy resin, by adding 22 parts of styrene, 3 parts of methacrylic acid, and 388 parts of demineralized water.

The flask is sparged for 30 minutes with nitrogen, then 3 parts of sodium sulfoxylate formaldehyde and 27 parts of demineralized water are added. The flask is the heated to 80° C., and a mixture is added in small increments over a 2 hour period, of 194 parts of styrene, 30 parts of methacrylic acid, and 3 parts of t-butyl hydroperoxide. When this addition has been completed, the flask is held at about 80° C. for 3 hours, then permitted to cool.

The final product has an NV of 24.6%, a viscosity of 13 seconds as measured on a No. 4 Ford cup at room temperature, and an Acid Number (NV) of 84. It is generally useful in the same manner as the composition of Example 15.

It should be noted that the components employed in making the composition of Example 16 are in the same relative proportions as were the components in Example 15. However, the procedure for making the final product differed slightly, in that about 10% of the monomer was initially present in the reaction vessel, with the dispersion of the graft polymer resinous reaction product, at the beginning of the second stage reaction. While the reported properties of the coating compositions produced by the two respective examples differ slightly, the compositions produced are believed to be essentially the same, the differences observed reflecting primarily batch-to-batch differences and observation errors in measurements.

EXAMPLE 17

Process Similar to Example 16, but With More of the Monomer (30%) Initially in the Reaction Flask Second Stage In this example, the process is very similar to that of Example 16.

The reaction vessel is charged with 3,330 parts of a dispersion of graft polymer resinous reaction product prepared in accordance with the process described in Example 3, first stage. There are also charged to the reaction flask 65 parts of styrene, 10 parts of methacrylic acid, and 388 parts of demineralized water. After sparging with nitrogen for 30 minutes, 3 parts of sodium sulfoxylate formaldehyde and 27 parts of demineralized water are added. The reaction vessel is then heated to about 80° C.

There is then added to the reaction vessel, gradually, in increments, such as dropwise, over a period of about 2 hours, while holding at about 80° C., a mixture of 151 parts of styrene, 23 parts of methacrylic acid, and 3 parts of t-butyl hydroperoxide. After the addition has been completed, the flask is held for 3 hours at about 80° C., then permitted to cool.

The final product contains 24.2% non-volatiles, and has a viscosity of 12 seconds as measured in a No. 4 Ford cup at room temperature. The Acid Number (NV) is 84.6.

The products of Examples 16, 17, and 18 are all useful per se as coatings and formulate well with pigments, cross-linkers, and other adjuvants.

EXAMPLE 18

Use of an External Surfactant

Second Stage

In this example, the dispersion of the graft polymer resinous reaction product employed is the same as in the previous example. 2,545 parts of this dispersion are placed in a reaction vessel, together with 165 parts of styrene, 25 parts of methacrylic acid, 277 parts of demineralized water, and 5 parts of a solution of the commercially available surfactant sold under the trademark Aerosol MA-80, which is in a 79 percent concentration aqueous solution. The flask is then sparged with 30 minutes with nitrogen.

After heating the flask to about 50° C., two parts of sodium sulfoxylate formaldehyde in 20 parts of demineralized water, and 2 parts of t-butyl hydroperoxide in 20 parts of demineralized water, are added. The flask is then heated to a temperature within the range from 75° C. to 80° C., and it is then held at that temperature for about 3 hours, then permitted to cool.

The final product contains 25.4% by weight of non-volatiles, and has a viscosity of 13 seconds as measured on a No. 4 Ford cup at room temperature. The Acid Number (NV) is 87.4.

Based on solids, the amount of surfactant employed in this example is approximately 0.5%.

The procedure of Example 18 is repeated, the only

In Table 4 and elsewhere herein, the letter "Q" or the term "Q Value" is used to refer to a weight percentage or to parts by weight of a particular component, based on total solids present in the final product. The Q value of the second stage added monomer is generally expressed as 1, and the Q values for other components show their relationship to the Q value of the second stage added monomer.

The highly ionized graft polymer resinous reaction product of the first stage serves as the medium in which the added addition polymerizable monomer is polymerized. When the added monomer is considered as a weight quantity Q, then it has been found empirically, through experimentation with a first stage reaction product of the kind produced in Example 3, that the total amount of ionized material present, that should be used in order to produce a stable, homogenous, dispersed end product, is in the range from about 0.3 Q to 20 Q or more, and preferably from about 0.5 Q to about 10 Q. Most preferably, the amount is in the range from 1 Q to about 5 Q. In the first stage graft polymer resinous reaction product, the ionized material included graft polymer having its side chains ionized, and ungrafted addition polymer, also ionized.

TABLE 4

Statistical Analysis

| | | Approximate Percentages by weight based on Total Polymer solids | | | | | | | Approximate Weight Ratio of Total Polymer to 2nd Stage Added Polymer | Approximate Weight Ratio 1st Stage Polymer to 2nd Stage Added Polymer |
|---|---|---|---|---|---|---|---|---|---|---|
| | | Total 1st Stage Unsaturated Monomer | Total 2nd Stage Unsaturated Monomer | Ionized* Polymer | | Non-ionized Polymer | | 2nd Stage Added Monomer** | | |
| Ex. | Epoxy | | | Amt. | Apx. Q Value | Amt. | Apx. Q Value | Amt. | Q Value | | |
| 1 | 45 | 15 | 40 | 36 | 0.9 | 24 | 0.6 | 40 | 1 | 2.5:1 | 60:40 |
| 2 | 58 | 19 | 23 | 46 | 2.0 | 31 | 1.3 | 23 | 1 | 4.3:1 | 77:23 |
| 3 | 56 | 14 | 30 | 42 | 1.4 | 28 | 0.9 | 30 | 1 | 3.3:1 | 70:30 |
| 4–10 incl. | 68 | 17 | 15 | 51 | 3.4 | 34 | 2.3 | 15 | 1 | 6.7:1 | 85:15 |
| 11–18 incl. | 60 | 15 | 25 | 45 | 1.8 | 30 | 1.2 | 25 | 1 | 4:1 | 75:25 |

*Calculated by assuming that 60% of total polymer solids from the first stage are ionized, and 40% are non-ionized (both are rough approximations).
**Note that when an acrylic is employed in the second stage monomer, it adds to the ionizable polymer present.

difference being that a sufficient amount of the surfactant is employed to constitute about 3% based on solids, dry basis. The final product contains 25.1% non-volatiles, and has a viscosity of 14 seconds, as measured on a No. 4 Ford cup at room temperature. The Acid Number (NV) is 84.8.

Upon further repetition of this demonstration of the invention, using 0.5% sodium lauryl sulfate based on solids, dry basis, and otherwise following the same procedures, a final product is obtained containing 24.4% non-volatiles and having a viscosity of 13 seconds as measured on a No. 4 Ford cup at room temperature. The Acid Number (NV) is 88.

All of these procedures produced useful coating compositions.

These and other studies have indicated that for sprayable compositions for sanitary coating applications, coverage properties can be improved by carrying out the second stage in the presence of the external wetting agent. Aerosol MA-80, Aerosol OT, and Emsol 4600, all sulfosuccinates, are the preferred external wetting agents.

Statistical Analysis of Examples 1–18 And Comments

For greater comprehension and easier understanding of the foregoing examples, a tabular analysis of the data presented has been made in Table 4, below.

In addition to the ionized material, the first stage resinous reaction product contains unreacted epoxy resin. The amount of such unreacted and non-ionized resin may be any value up to about 20 Q, but preferably is from about 0.3 Q to about 10 Q, and more preferably, from about 0.5 Q to about 5 Q, and most preferably, from about 1 Q to about 2 Q.

The amount of non-ionized resin that may be dispersed depends upon the amount of ionized material present. For dispersions where the graft polymer resinous reaction product is acid-functional, the Acid Number (N.V.) of the first stage graft polymer resinous reaction product is a convenient way to express ionizability, and generally, there should be substantially complete ionization in the dispersion. A range of 30 to 200 in Acid Number (N.V.) will suffice to produce dispersion, generally, and a range of 45 to 150 is preferred. For stable, sprayable, sanitary coating composition dispersions, a range from about 80 to about 90 is preferred. These values apply also to the solids-augmented product of the second stage, of which the Acid Number may be adjusted conveniently by incorporating an acrylic acid in the second stage monomer.

For dispersions where the graft polymer resinous reaction product is base-functional, a convenient way to define ionizability is in terms of the content of tertiary amino nitrogen, although other indicators are also useful. For stable dispersions, the tertiary amino nitrogen content should be from about 0.4% to about 1.3% by weight of total resinous solids present, although a much wider range is useful where some degree of settling can be tolerated. Generally the tertiary amino nitrogen is substantially completely neutralized with a fugitive monocarboxylic acid containing 1 to 5 carbon atoms or with a fugitive inorganic acid, such as hydrochloric acid. Where ionization is achieved through the use of a quaternizing agent, such as dimethyl sulfate, generally stable dispersions can be developed when the content of quaternary nitrogen based on total polymer solids present is from 0.02% to about 0.2%.

Some examples of base-functional graft polymer resinous reaction products, and processes for producing them, appear below. These products can be used in the practice of the present invention.

EXAMPLE 19

Water Dispersible Resin Containing Amine Functionality First Stage Graft Polymer Resinous Reaction Product; Amine-Epoxy Adduct 2-butoxy-ethanol-1 (32.9 parts) and Dow epoxy resin 661 (30 parts) are placed in a four-necked round bottom flask equipped with a nitrogen inlet, thermometer, condenser set for reflux, mechanical stirrer with a stainless steel shaft and blade, and an addition funnel. This mixture is heated to 115°–120° C. under a nitrogen blanket. A monomer mixture is prepared from 2-hydroxyethyl acrylate (8 parts), butyl acrylate (44 parts), styrene (24 parts), glycidyl acrylate (4 parts) and 78% active wet benzoyl peroxide (6.9 parts) and mixed for 30 minutes in an erlenmeyer flask. This monomer solution is added to the epoxy solution through the addition funnel over 2.5 to 3 hours.

After the monomer addition is complete, the resin is held at 115°–120° C. for an additional 2 hours. The resin is then cooled. % orirane, 0.76; non-volatiles by weight, 71.1%, full body viscosity, $Z_4$–$Z_5$ Gardner.

In a four-necked round bottom flask equipped as above, 103.4 parts of the resin product is heated to 115°–120° C. under a nitrogen blanket with stirring. Methylethanol amine (3.7 parts) is added through the addition funnel over 15–60 minutes, keeping the temperature less than or equal to 120° C. After the addition is completed, the resin is held for 1 hour at 115°–120° C. Milli-equivalents of amine per 100 g. non-volatile resin is 60.9. Non-volatiles by weight, 72.3%. Full bodied viscosity, $Z_6$–$Z_8$; Color (Gardner), 15.

To 112.8 parts of above amine-containing, base-functional, graft polymer resinous reaction product the following is added: 6.6 parts lactic acid, 4.0 parts 2-butoxy-ethanol-1, 4.0 parts of 2-hexoxy-ethanol-1, and 872.6 parts water. The resulting aqueous dispersion is stable, and is suitable for electrocoating and also for further reaction with olefinic monomers.

Second Stage In Situ Vinyl Polymerization

When the aqueous dispersion from the first stage reaction above is employed as the vehicle for an in situ vinyl polymerization as in Examples 1 through 5 above, the resulting aqueous dispersions are augmented in vinyl solids content and as in those Examples the end product has a proportionately reduced solvent content. The dispersions are useful in formulating coatings or may be used directly as clear, water-reducible air-drying or bake coatings.

EXAMPLE 20

Amine Functionality Achieved Through the Use of an Unsaturated Amine Monomer

First Stage; Graft Polymer Production

In a four-necked round bottom flask set up as described in Example 19, a solution of Dow Epoxy Resin 661 in 2-butoxy-ethanol-1 (46.66 parts, weight non-volatiles, 64%) is heated to 76° C. Diethanol amine (86% active, 5.11 parts) is added dropwise over 20 minutes, allowing the temperature to increase to 100° C. After the addition is completed, phenol (1.31 parts) is added through a powder funnel to the reaction mixture. The heat is increased to 130°–140° C. and held for 2 hours.

A monomer and initiator solution is prepared by mixing styrene (19 parts), butyl acrylate (38.6 parts), 2-hydroxy-ethyl acrylate (7 parts), dimethylaminoethyl methacrylate (5 parts), and dicumyl peroxide (4.2 parts). This monomer solution is then added to the reaction mixture over 4 hours, holding the temperature between 135° C. and 141° C. After the addition is complete, the resin is held at 141° C. for 1 hour. Weight non-volatiles, 81.3%; milli-equivalents amine per 100 grams non-volatile resin, 36.7; viscosity (6 parts resin, 4 parts 2-butoxy-ethanol-1), W-X.

59.2 parts of the above resin was blended with 3.02 parts lactic acid, 6.98 parts of 2-butoxy-ethanol-1 and 156.26 parts water. The resultant product was an aqueous dispersion with good appearance. The dispersion had 21.5% N.V. It was useful per se in formulating coatings.

Second Stage Solids Augmentation

The aqueous dispersion produced above may be employed as the vehicle for an in situ vinyl polymerization as in Examples 1 through 5 above, with the production of vinyl solids-augmented products in dispersed form, which may be used directly as coatings, or after formulation with pigments and functional adjuvants.

EXAMPLE 21

Variant Process for Producing Amine-Containing, Base-Functional Graft Polymer Resinous Reaction Product First Stage In a four-necked round bottom flask set up as in Example 19, but with a nitrogen sparge, dimethyl amino propyl amine (448 parts) is heated to 130° C. Dow Epoxy Resin 671 (2800 parts, 75% non-volatile by weight) is added over 2.5 hours at 130°–131° C. After a 2 hour hold, the xylene (6.59 parts) (present in the resin as supplied) is removed under reduced pressure, increasing the temperature to 170° C. (maximum vacuum used is 24"). The temperature then is reduced to 154° C. and alpha-olefin epoxide (260 parts) is added over 1 hour and held for two hours at 150°–155° C. 2-butoxy-ethanol-1 (702 parts) is added to reduce the viscosity. Non-volatiles by weight, 77.5%, milli-equivalents of amine per 100 grams non-volatile resin, 255.

In a flask set up as described in Example 19, a quantity of the above resin (46 parts) is heated to 85° C. under a nitrogen blanket. A monomer and initiator solution is prepared by mixing styrene (19 parts) butyl acrylate (38.6 parts), 2-hydroxyethyl acrylate (7 parts), dimethylaminoethyl methacrylate (5 parts), and dicumyl peroxide (4.2 parts) for 30 minutes. This solution is added to the reactor through an addition funnel over 2½ to 3 hours, allowing the temperature to drop to 166° C. The resin is held at 166°-167° C. for an additional 2 hours. Non-volatiles by weight, 81.5%; milli-equivalents of amine per 100 grams of non-volatile, 86.8; color (Gardner), 12; viscosity (6 parts plus 4 parts ethylene glycol monobutyl ether), O-P.

The above resin can be dispersed in water by the addition of suitable amounts of lactic acid and water. It is useful per se in coatings and can be used as the vehicle for in situ vinyl polymerization as in the preceding examples.

EXAMPLE 22

Epoxy Resin Advancement as a Part of the Process

First Stage; Use of Sodium Acetate as the Catalyst for the Epoxy Advancement Reaction To a 5 liter flask fitted with an agitator, thermometer, and nitrogen gas inlet tube, 1084 grams of low molecular weight epoxy (Epon 828, Shell), 614 grams Bisphenol A, 57 grams xylene and 310 grams 2-butoxyethanol-1 was charged. This mixture was then heated to 85° C. with a nitrogen sparge present. At 85° C., 0.51 g. of sodium acetate dissolved in 2.5 g. $H_2O$ was added to the flask. A 17" Hg vacuum was then pulled on the reaction vessel and the contents were heated to 140° C. The heat was then turned down and vacuum continued until 28.7 grams of volatiles were removed from the reaction flask. The reaction mixture was then held at 175° C. until a viscosity of $Z_2$ at 40% in 2-butoxyethanol-1 was reached. At this time 170 g. 2-butoxyethanol-1 was added and the reaction product was cooled to 155° C. when 826 grams f normal butanol was added over a period of time to allow the solvent to mix in without refluxing heavily.

The reaction product temperature was then allowed to drop to 117° C. When the temperature was stable at 117° C., a mixture of 283 g. methacrylic acid, 148 grams styrene, 4 grams ethyl acrylate, 38.5 grams benzoyl peroxide and 111 grams 2-butoxy-ethanol-1 were added to the reaction flask over a period of 2 hours. At the end of the addition 62 grams of n-butanol was added. The reaction product was then held at 117°-118° C. for 3 hours.

At the end of 3 hours, 2,683 grams of the reaction product was added to a mixture of 3,411 grams DM $H_2O$, 193 grams 2-butoxy-ethanol-1, and 152 grams of dimethyl ethanol amine, which was then heated to 50° C. An additional 560 grams of DM $H_2O$ was then added 10 minutes later. The constants of this emulsion were: NV—22.9%, #4 Ford Cup visc.—31 seconds; Acid Number—83.6 on NV; Base Number—64.3 on NV. This product was mixed overnight and allowed to cool to room temperature.

The dispersed product was useful in formulating stable, sprayable beverage can coating compositions.

Second Stage: 75:25 First Stage Solids to Second Stage Solids Ratio; Approx. 22 Styrene to 3 Methacrylic Acid 2,545 grams of the above dispersion product was charged to a 5 liter flask fitted with an agitator, thermometer and nitrogen sparge tube. 277 grams of DM $H_2O$, 165 grams of styrene and 25 grams of methacrylic acid were then charged to the flask. This mixture was then agitated 30 minutes while sparging with nitrogen. After 30 minutes the mixture was heated to 52° C. and the heat was turned off. 2 grams sodium sulfoxylate formaldehyde dissolved in 20 grams of tert. butyl hydroperoxide diluted with 20 grams of DM $H_2O$ was added to the flask. 10 minutes later the heat was applied and the reaction material heated to 80° C. and held 3 hours and 20 minutes. This product was then cooled below 30° C. with agitation. The final constants were: NV—24.7%, Visc. #4 Ford Cup—11.5 seconds, Acid Number on NV—90.8, Base Number—49.5 on NV.

The resultant product was further formulated for use as a can coating by the addition of a suitable amount of crosslinker, such as Cymel 303, and also by small additions of surfactant and other modifiers. The final coating was sprayed on the interior of cans. At a film weight of 115 to 125 mg. per can, the product showed good coverage (enamel rater value of 21), and at a film weight of 160 mg per can, the first signs of blistering were observed.

EXAMPLE 23

Large Scale Production

Second Stage; Sprayable Sanitary Coating Composition Process

A large batch of first stage dispersed product is used as the initial material for an in situ vinyl solids augmentation.

This batch consists of 53,875 lbs. of production material useful per se in formulating a beverage can coating. Its approximate characteristics are 22.5% N.V.; viscosity, #4 Ford cup at 77° F. (25° C.), 55 seconds; pH, 7.3; Base Number (N.V.), 60; milli-equivalents of amine per 100 g. of resin (N.V.), about 106. Its solids are derived from 10,220 lbs. of epoxy resin and 1,648 lbs. of methacrylic acid, 860 lbs. of styrene, and 22 lbs. of ethyl acrylate (2,530 lbs. monomer total).

In separate tanks, several mixtures are prepared for use in the second stage reaction. A mixture is made of 3,500 lbs. of styrene and 532 lbs. of methacrylic acid (Acid Number of the mixture, about 86). Another mixture is made of 41.8 lbs. of hydrosulfite in 430 lbs. of demineralized water. A third mixture is prepared of 41.8 lbs. of t-butyl hydroperoxide in 430 lbs. of demineralized water.

Then 5,860 lbs. of water are added to the batch of production material. The temperature is adjusted to about 122° F. (50° C.) and the mixture is stirred for about one-half hour. The monomer mixture is then added. Mixing is continued throughout. The temperature is again adjusted to about 122° F. (50° C.). The hydrosulfite mixture is added, then after two minutes, the hydroperoxide mixture is added. After ten minutes, the temperature is adjusted over 45 minutes or so to 175° F. (79° C.). After about 2½ hours at this temperature the batch is cooled below 90° F. (32° C.) and then filtered.

The product (RP 23-1) has about 25% NV, a #4 Ford cup viscosity at 77° F. (25° C.) of about 15 seconds, a Base Number (N.V.) of about 46, and an Acid Number (N.V.) of about 85. Its solids composition is derived roughly about 76% from first stage solids, about 21% from styrene, and about 3% from methacrylic acid.

A preferred sprayable formulation for beverage can application, from this product, has approximately the following formulation:

|  | % by Weight |
|---|---|
| RP 23-1 | 75.6 |
| dimethyl ethanol amine | 1.21 |

-continued

| | % by Weight |
|---|---|
| Aerosol MA-80 (80%) | 0.12 |
| Cymel 303 | 0.97 |
| DMW | 22.1 | and the following characteristics: about 20.5% NV; #4 Ford cup viscosity at 77° F. (25° C.), about 32 seconds; milli-equivalents of amine per 100 g. of resin (N.V.), about 137 or so and pH, about 8.1–8.2.

GENERAL

When the added second stage monomer is polymerized in situ in an aqueous dispersion of the first stage graft polymer resinous reaction product, the properties of the final product can be custom produced. The extent of ionization can be such that the particles remain in stable suspension almost indefinitely under room temperature storage conditions, without agitation. The particles appear to have some of the characteristics of suspended particles and some of the characteristics of a solute. The particles are considered to be visible to the naked eye, since the preferred dispersions are opalescent. However, since the suspension can be prepared so that no settling occurs, the dispersion may be either unusually stable or the material can be considered to be, in part at least, in solution. The ionized material in the reaction product of the first stage appears to play a role in causing the second stage polymerization to result in a product in which the particles remain dispersed.

It is possible to employ an external surfactant during the second stage polymerization, as was demonstrated in Example 18. The use of an external surfactant appears to be particularly valuable in improving the coverage and adhesion characteristics of coatings prepared from the in situ polymerizate. A wide variety of commercially available external surfactants are available for use. Anionic agents such as Tamol 731 of Rohm and Haas and Daxad 30 of W. R. Grace are exemplary. Another satisfactory and preferred external surfactant, of the kind used in Example 18, is Aerosol MA, a product of American Cyanamid, available as an 80% solution in water of tetra sodium N-(1,2-dicarboxyethyl-N-octadecylsulfosuccinamate). Another satisfactory external surfactant is Aerosol 22, a product of American Cyanamid, available as a 35% solution in water of sodium dihexyl sulfosuccinate. Combinations of two or more external surfactants may also be used.

The introduction of a wetting agent as an external surfactant may affect blush resistance, particularly at baking temperatures up to about 400° F. (204° C.). The addition of a cross-linker such as Cymel 303, however, improves the situation.

The amount of solvent and water present in the first stage should be kept at a level that facilitates handling. Generally, it is preferred during the first stage to use a solvent system, most preferably a water-miscible system, although the use of solvent is not essential. Epoxy resins are generally soluble in ketones, ethers, and esters. Solvents that may be used are n-propyl ketone, methyl isobutyl ketone, diisobutyl ether, n-propyl acetate, n-butyl acetate, ethyl butyrate, an alkoxyetanol, or an alkyl ether of diethylene glycol. A preferred solvent is 2-butoxy-ethanol-1.

Preferably, a solvent system is used, in which, in addition to the first solvent, a second organic liquid solvent is present that need not necessarily dissolve the epoxy resin itself, but that is miscible with the first solvent and can dissolve or solvate the side chains on the backbone resin and the addition polymer in the first stage product as well. The preferred second solvent is n-butanol.

In any case it is not necessary that a solution be made at any stage. The purpose of the solvent(s) is to facilitate handling rather than to dissolve the components.

While the process has been exemplified as being carried out in an aqueous dispersion, the presence of water is not believed to be essential. It appears that the in situ second stage polymerization can be carried out where there is just enough solvent present to permit the material to be handled in a practical manner, or even no solvent present, provided handling remains feasible. Preferably, however, enough solvent and water are present in both the first stage and second stage products to facilitate handling. For a second stage product, a 40% concentration of solids may be workable, depending on its constitution, but a product at even 35% solids is very thick. Accordingly, it will often be found convenient to produce product at 20% to 30% solids content, for facile formulation for application to surfaces.

Water is the only practical dispersing agent where the material is to be ionized. Liquid ammonia and hydrazine are technically feasible, but only water is practical, to permit ionization to occur.

The term "dispersoid" is employed herein to refer to the finely divided particles that impart the opalescent appearance to the products of the present invention.

The first stage product, prior to inversion in water, preferably contains about 60% by weight solids and about 40% by weight of solvents. During inversion, when water and a fugitive amine or other ionizing agent are added, the percentages of solids and of organic solvents, based on total composition, are decreased. During the second stage, with the addition of more solids and more water, the percentage of organic solvent based on total composition is reduced even further. This is an important advantage since the amount of solvent that can be released into the atmosphere is often restricted by law in many areas.

The epoxy resins employed in the practice of the invention have been identified primarily in terms of desired molecular weight or EEW. They are more specifically identified in the earlier applications mentioned above. Dow Chemical's D.E.R. 331 epoxy resin is a preferred low molecular weight starting resin, but its EEW is preferably advanced to about 4,000 or so for use. Comparable, commercially available epoxy resins can be advanced to a useful EEW with a catalyst such as sodium or potassium acetate, or similar alkaline materials. Since some resins are sold in solvents and/or with residual catalysts, care must be exercised.

Dow's D.E.R. 669 epoxy resin, EEW about 4,500, is useful, as is its D.E.R. 668, EEW about 2,750. Shell's Epoxy Resin 1010, EEW about 5,000, and its Epon Resin 1009, EEW about 3,250, are also useful. These are solid resins.

Useful second stage vinyl monomers include vinylidene chloride; arylalkenes, such as styrene, vinyl toluene, alpha-methyl styrene, dichlorostyrene, and the like; C 1 to C 15 alkyl acrylate esters, and particularly, lower alkyl acrylates, such as methyl acrylate, butyl acrylate, and lower alkyl methacrylates, such as methyl methacrylate, butyl methacrylate, and, as well, the nonyl, decyl, lauryl, isobornyl, 2-ethyl hexyl, and octyl esters of acrylic or methacrylic acid, also trimethylol-propane trimethacrylate, 1,6-hexanediol dimethacrylate, and the like; hydroxy lower alkyl acrylates, such as hydroxy propyl acrylate, hydroxy ethyl acrylate, and the like; hydroxy lower alkyl methacrylates, such as hydroxy ethyl methacrylate, hydroxy propyl methacrylate, and the like; amino lower alkyl methacrylates, such as N,N-dimethylamino ethyl methacrylate; amino lower alkyl acrylates, such as N,N-dimethylamino ethyl acrylate; lower alkenyl nitriles, such as acrylonitrile, methacrylonitrile, and the like; lower alkenyl carboxylic acids, such as acrylic acid, methacrylic acid, and the like; lower alkenyl amides, such as acrylamide, methacrylamide, isobutoxymethylacrylamide, and the like; lower hydroxyalkyl alkenyl amides such as hydroxy methyl acrylamide, and the like; lower alkyl butenedioates such as dibutyl maleate, dibutyl fumarate, and the like; vinyl lower alkenoates, such as vinyl acetate, and vinyl propionate, and the like; vinyl chloride and other vinyl halides; isoprene, conjugated butadiene, and the like; etc.

Presently preferred vinyl monomers include styrene, butyl acrylate, ethyl acrylate, and methacrylic acid. Up to about 25% allyl materials by weight of total vinyl monomer may be included.

In order to cause the vinyl monomer to polymerize, at least one initiator is introduced into the first stage aqueous dispersion before or during addition thereto, with agitation, of such vinyl monomer. As used herein, the term "initiator" or "free radical initiator" has reference to any substance which when added appears to promote addition polymerization. The amount of initiator used in the second stage polymerization typically is in the range from about 0.1 to 5 parts per 100 parts by weight of total vinyl monomer added to a first stage or equivalent product, and preferably from about 0.5 to 3 parts per 100 parts total vinyl monomer, but larger or smaller amounts may be used.

Evaluation of a single step, gradual addition of second stage monomer, as against the use of "heels" as in Examples 16 and 17, indicates that the use of heels apparently offers no present advantage, and that batches prepared by the single step but gradual addition technique often exhibited apparently superior spray properties. Working with this single step approach, it appears that the use of 1% of initiator, added at 50° C. and held at 80° C., looks best from the standpoint of effective conversion of the monomer.

Initiation provided by a redox system is extremely effective. An organic peroxide may be used or an inorganic peroxide such as hydrogen peroxide, ammonium persulfate, sodium persulfate, or potassium persulfate. The peroxide catalyst is effectively coupled with a reducing agent such as an alkali metal sulfite, bisulfite, or metabisulfite, or hydrosulfite, or hydrazine. The action of the redox system may be controlled through the use of a chain transfer agent or regulator, such as mercaptoethanol or other mercaptan. Such a regulator also finds use outside of redox systems with organic or inorganic peroxides and with azo catalysts, such as azodiisobutyronitrile, azodiisobutyramide, or diethyl azodiisobutyrate.

Preferred initiators comprise the persulfates, such as potassium persulfate, sodium persulfate, ammonium persulfate, and the like. Another useful class of initiators comprises percarbonates, such as diisopropyl percarbonate, and the like.

Another useful class of initiators comprises organic peroxides. One group of suitable peroxides comprises diacyl peroxides, such as benzoyl peroxide, lauroyl peroxide, acetyl peroxide, caproyl peroxide, butyl perbenzoate, 2,4-dichloro benzoyl peroxide, p-chlorobenzoyl peroxide, and the like. Another group comprises ketone peroxides, such as methyl ethyl ketone peroxide and the like. Another group comprises alkyl hydroperoxide such as t-butyl hydroperoxide, and the like. Another group comprises aqueous hydrogen peroxides.

Examples of azo catalysts include azodiisobutyronitrile, azodiisobutyramide, dimethyl or diethyl or dibutyl azodiisobutyrate, azobis ($\alpha$, $\gamma$-dimethylvaleronitrile), azobis ($\alpha$-methylbutyronitrile), azobis ($\alpha$-methylvaleronitrile), dimethyl or diethyl azobismethylvalerate, and the like.

Generally the initiator is chosen with a half life such that an effective amount is present during the polymerization to insure complete reaction. The preferred initiators are those which are virtually completely consumed when a polymerization is complete.

Certain other classes of materials can be present at the time of, or during such a polymerization, such as chain transfer agents such as n-octylmercaptan, and t-dodecyl mercaptan; reducing agents, such as sodium bisulfite, sodium formaldehyde sulfoxylate, sodium hydrosulfite, and sodium thiosulfate, and the like agents. The amount of such agents or additives if such are used is characteristically less than above five weight percent based on total solids present in a reaction system. Such additives are known to those skilled in the art of vinyl monomer polymerization.

In general, in situ polymerization of the vinyl monomers in accordance with the teachings of this invention proceeds under liquid phase conditions at temperatures in the range from about 25° to 100° C., and preferably, from 50° C. to 100° C., and most preferably, from about 50° to 80° C. Polymerization times are variable, depending upon starting materials, conditions, and the like; typical reaction times and monomer addition rates range from about 1 to 3 hours, but longer and shorter times are common.

Under some circumstances, the use of exceptionally high temperatures may be desired. In such cases, when the epoxy resin has been terminated to reduce the likelihood of undesired reactions, the polymerization temperature may be as high a 160° C. The rate of monomer polymerization is controlled not only by temperature, but also by such variables as the amount and type of initiator(s) used, its concentration, the concentration and type of other solids present, and by other factors.

In making a product in accordance with this invention, the vinyl monomer generally is added gradually or by increments to an aqueous dispersion of a highly ionized graft polymer resinous reaction product, the ionized sites being located on the side chains, at a rate such that the exothermic polymerization can be controlled adequately. Under favorable circumstances, such as controllable exotherm, the monomer can be added in bulk, and this technique is generally preferred for the production of dispersions to be used in formulating sanitary coating compositions, but as shown in several of the demonstrations of the invention above, however, some of the monomer may be present with the dispersion as a "heel", at the time the remainder of the monomer, plus initiator, is added.

Typically, in such an in situ polymerization process, the aqueous dispersion to which the monomer is added may contain at least one water-miscible organic liquid solvent which may be present in an amount up to about 60% based on total organic liquid solvent, the balance, also preferably up to about 60% of total organic liquid solvent present, being another watermiscible liquid in which the addition polymer is soluble. With the possible exception of certain monomers like vinyl acetate, the polymerization of vinyl monomers in the presence of a first stage dispersion as taught by the present invention surprisingly results in conversions which are characteristically above about 90% based on total starting monomer, and generally above about 95%.

Other techniques are known for suspending epoxy resins in aqueous dispersions than those of the present invention. Similarly, other acid-functional and base functional polymers have been suggested for use as dispersed phase materials in liquid media in which vinyl polymerizations are to be conducted, for the purpose of promoting the formation of polymer particles of very fine size and/or stabilizing the vinyl polymer particles in suspension as formed and after their formation. However, the first stage dispersions of the earlier patent applications identified above, including an acid functional graft polymer, are preferred for use in the present invention. Where the system is acid-functional and especially for ionizing a second stage acid-functional vinyl polymer, dimethyl ethanolamine is preferred. Other fugitive bases that have been employed include di-isopropanolamine, triethanolamine, tri-isopropanolamine, diethyl ethanolamine, and ammonia. (A fugitive base is one that leaves no appreciable residue on forced drying at 400° F.)

When the first stage graft polymer resinous reaction product, and/or the second stage vinyl polymer is base-functional, the neutralizing agent employed is an acid, preferably a fugitive acid. A few representative suitable materials are hydrochloric acid, sulfuric acid, phosphoric acid, formic acid, chloroacetic acid, acetic acid, glycolic acid, malic acid, maleic acid, fumaric acid, succinic acid, lactic acid, and the like. Quaternizing agents may also be employed in connection with tertiary amino nitrogens in the molecule. These may include, for example, methyl iodide, dimethyl sulfate, methyl chloride, ethyl chlroide, and the like.

For coatings that will be in contact with edibles, toxic materials should be avoided.

The use of a graft polymer in accordance with the earlier patent applications permits the use of functional polymer of relatively high molecular weight. For that reason, and because of the advantages that accrue from the use of a graft polymer of molecular weight above 4,000 and preferably of 8,000 M.W. to 12,000 M.W., the functional polymer preferably is a graft polymer with a backbone of M.W. of at least 4,000, with its functionality derived from side chains bonded to the backbone by stable carbon-to-carbon bonding, so that the graft polymer is resistant to hydrolysis.

Generally the first stage and second stage products are characterized as film-forming, i.e., they are capable of forming a continuous and cohesive film at room temperature and/or at bake-curing temperatures.

To make especially durable surface coatings from the resulting dispersed product it is advantageous to cross-link with an aminoplast resin. Typical aminoplasts include melamine, benzoguanamine, acetoguanamine, and urea resins such as urea-formaldehyde. Commercially available aminoplasts which are water soluble or water dispersible for this purpose include Cymel 301, Cymel 303, Cymel 370, and Cymel 373 (all being products of American Cyanamid, Stamford, Connecticut, and being melamine based, e.g., hexamethoxymethyl melamine for Cymel 301), and Beetle 80 (products of American Cyanamid which are methylated or butylated ureas). If acrylamide or the like is used as a vinyl monomer in either the first stage, the second stage, or both, in an acid-functional resinous reaction product, the product will be self cross-linking. Another way to introduce cross-linking capability into the reaction mixture and the graft polymer is by utilizing as all or part of the polymerizable monomer, in the initial first stage monomer mixture, an alkyl derivative of acrylamide or a material such as bis maleimide.

Other suitable aminoplast resins are the type produced by the reaction of aldehyde and formoguanamine; ammeline; 2-chloro-4,6-diamine-1,3,5-triazine; 2-phenyl-p-oxy-4,6-diamino-1,3,5-triazine; 2-phenyl-p-oxy-4,6-trihydrazine-1,3,5-triazine; and 2,4,6-triethyl-triamino-1,3,5-triazine. The mono-, di-, or triaryl melamines, such as 2,4,-triphenyl-triamino-1,3,5-triazine, are preferred. Other aldehydes used to react with the amino compound to form the resinous material are crotonic aldehyde, acrolein, or compounds which generate aldehydes, such as hexamethylenetetramine, paraldehyde, and the like.

If there is little or no oxirane functionality in the graft polymer, then a cross-linker is necessary; otherwise, it is desirable, but the graft polymer is self cross-linking with heat.

The coating composition of the present invention can be pigmented and/or opacified with known pigments and opacifiers. For many uses, including food uses, the preferred pigment is titanium dioxide. Generally the pigment is used in a pigment-to-binder ratio of 0.11:1 to 1:1, by weight. Thus titanium dioxide pigment can be incorporated into the composition in amounts of from about 5% to 40% by weight, based on solids in the composition.

The resulting aqueous coating composition can be applied satisfactorily by any conventional method known in the coating industry. Thus, spraying, rolling, dipping, flow coating or electrodeposition applications can be used for both clear and pigmented films. Often spraying is preferred. After application onto a metal substrate, the coating is cured thermally at temperatures in the range from about 95° C. to about 235° C. or higher, for periods in the range from 1 to 20 minutes, such time being sufficient to effect complete curing as well as volatilizing of any fugitive component therein. Further, films may be air dried at ambient temperatures for longer periods of time.

For metal sheet substrates intended as beverage containers and particularly for carbonated beverages such as beer, the coatings should be applied at a rate in the range from 0.5 to 15 milligrams of polymer coating per square inch of exposed metal surface. To attain the foregoing, the water-dispersible coating as applied can be as thick as 1/10th to 1 mil.

CONCLUSION

Compositions prepared in accordance with the present invention are useful directly as coating compositions, or as the base from which coating compositions can be formulated. However, in its preferred embodiments, with which the examples of this application are primarily concerned, the invention is concerned with the production of water-reducible, sprayable compositions for use for coating cans for beverages, especially beer cans.

Coatings prepared in accordance with the invention offer economy, relatively low ratio of organic solvents to solids (an important environmental consideration, and the achievement of sprayable consistencies with the least organic solvent content feasible.

Beer can coating compositions prepared in accordance with the present invention exhibit excellent good stability, good turbidity resistance, blush properties, and good adhesion to cans, whether made of aluminum, steel, or tin plate. Such coating compositions can be cured in a few seconds at 450° F. or so (about 230° C.), but are also curable at lower temperatures such as 400° F. (204° C.), and exhibit superior properties as to resin volatilization (fuming). When filled, the coated can may be exposed to elevated temperatures, as during pasteurization, without blush. Such coated cans impart no taste to the beverage, and the beverage does not develop any undesirable flavor notes, turbidity, or haze. In addition, the coatings permit the necessary forming operations to be accomplished on the coated metal without the development of cracks, pin-holes, or the like. The coatings are resistant to pasteurization temperatures and do not contain any components that migrate into the beverage during pasteurization or storage.

While compositions prepared in accordance with the invention are primarily intended for use as liquid coatings, they may be reduced to powders for application or for reconstitution to flowable form.

The process of the invention makes more efficient use of manufacturing equipment per unit of solids sold, and thus reduces costs and the need for additional reactor capacity. While the "second stage" has been described and exemplified herein as comprising a single in situ vinyl polymerization for solids augmentation, there may be two or even more successive such polymerizations, depending upon the final properties and composition desired.

While the invention has been disclosed by reference to the details of preferred embodiments thereof, it is to be understood that such disclosure is intended in an illustrative rather than in a limiting sense, and it is contemplated that various modifications in the compositions and processing techniques, in particular, will readily occur to those skilled in the art, within the spirit of the invention and within the scope of the appended claims.

What is claimed is:

1. A process for addition polymerizing through its ethylenic unsaturation a quantity of Q parts by weight of addition polymerizable ethylenically unsaturated monomer in an aqueous medium using free radical initiation which comprises:

(a) incorporating a quantity Q of an ethylenically unsaturated addition polymerizable monomer and initiator therefor, in an aqueous, liquid reaction medium that is a dispersion in an aqueous vehicle of a resinous dispersoid of at least 0.3 Q to about 20 Q or more of at least one ionized polymer comprising a graft copolymer having a backbone including aliphatic carbon atoms on which an ionizable addition polymer side chain is bonded by a carbon-to-carbon bond in place of a hydrogen atom that is bonded thereto in the ungrafted state, said graft copolymer being formed by grafting at least one addition polymerizable monomer, including ionizable monomer, onto a polymer substrate selected from the group consisting of: homopolymers and copolymers of vinyl chloride; homopolymers and copolymers of acrylic monomers; hydrocarbon resins from butadiene, styrenes, and coumaroneindenes; polyurethanes; polyesters; and aromatic epoxy resins; to form at least one side chain bonded by carbon-to-carbon grafting to one of said backbone carbons, the ionization being on the side chain, and from zero up to about 20 Q of at least one other polymer that is selected from said group and that is not appreciably ionic in nature, thereby providing an initial reaction medium having a continuous aqueous liquid phase and polymeric dispersed phase, said reaction medium also including an amount up to 200% by weight of said resinous dispersoid of an organic liquid that is miscible with water and that comprises a solvent for at least some of the solids of said dispersoid;

(b) polymerizing said monomer at a temperature at least as high as about room temperature and under pressure sufficient for keeping the continuous aqueous phase in a liquid state, and in the presence of a sufficient amount of said initiator for causing addition polymerization of said monomer at said temperature;

the amount of water initially present in said aqueous vehicle and any amount of water that is added during said addition polymerization being sufficient for keeping the solids content of the reaction mixture from step (b) above from exceeding about 60% by weight of the reaction mixture at any time.

2. The process of claim 1 wherein said backbone polymer and said other polymer that is not appreciably ionic in nature are each an aromatic epoxy resin having a molecular weight of at least 1,000.

3. The process of claim 2 wherein said addition polymer side chains comprise repeating, polymerized monomer units that are ionized in said aqueous vehicle.

4. The process of claim 3 wherein there is about 0.3–6 Q of said other epoxy resin polymer, that is an aromatic 1,2-epoxy diepoxide resin or a terminated aromatic 1,2-epoxy diepoxide resin.

5. The process of claim 4 wherein said initiator and quantity Q of monomer are added to the aqueous reaction medium gradually and while agitating the reaction medium.

6. The process of claim 2 wherein said quantity Q monomer is devoid of ionizable functional groups.

7. A process for conducting a vinyl polymerization comprising bringing together:

a. a dispersion in an aqueous vehicle of an ionized graft polymer having a backbone including aliphatic carbon atoms on which an ionizable addition polymer side chain is bonded by a carbon-to-carbon bond in place of a hydrogen atom that is bonded thereto in the ungrafted state, said graft copolymer being formed by grafting at least one addition polymerizable monomer, including ionizable monomer, onto a polymer substrate selected from the group consisting of: homopolymers and copolymers of vinyl chloride; homopolymers and copolymers of acrylic monomers; hydrocarbon resins from butadiene, styrenes, and coumaroneindenes; polyurethanes; polyesters; and aromatic epoxy resins; to form at least one side chain grafted to the backbone by carbon-to-carbon bonds at one of said backbone carbons, there being ionized groups present in the dispersion, located on the side chains of the graft polymer molecules, in sufficient quantity to establish the graft polymer in suspension the aqueous vehicle, and b. at least one vinyl monomer and initiator therefor; under conditions of pressure, temperature, concentration and agitation that permit said vinyl monomer to polymerize in situ in the dispersion in dispersed form.

8. The process of claim 7 wherein the side chains are formed from addition polymerizable monomer including unsaturated carboxylic acid, the carboxylic acid groups on the side chains being ionized.

9. The process of claim 7 wherein ionized groups are ionized amine groups present in the side chains of the graft polymer molecule.

10. A process for increasing the addition polymer content of a resinous reaction product that is dispersed in an aqueous liquid vehicle wherein the said resinous reaction product comprises:

a. an aromatic 1,2-epoxy diepoxide resin having a molecular weight above 1,000 and having a backbone including aliphatic carbons having only one or two hydrogens bonded thereto;

b. addition polymer formed in the presence of said resin by free radical initiation polymerization of ethylenically unsaturated monomer, and c. graft polymer consisting of a backbone on which an ionizable addition polymer side chain is bonded by a carbon-to-carbon bond in place of a hydrogen atom that is bonded thereto in the ungrafted state, said graft polymer being formed by grafting of the addition polymer side chain to a backbone of an aromatic 1,2-epoxy diepoxide resin of the same kind as in (a) hereof, by the addition polymerization of the ethylenically unsaturated monomer in the presence of the resin; said addition polymer and said graft polymer being ionized, said resin providing at least 30 percent of the solids content of the initial reactants from which the said resinous reaction product is formed, and said liquid vehicle including at least one organic liquid solvent material that facilitates the processing of said resin and said polymers; said process comprising, adding addition polymerizable monomer containing ethylenic unsaturation, and initiator for the addition polymerization thereof, to the resinous reaction product in said aqueous vehicle, and imposing conditions of temperature, pressure, concentration and agitation thereon that cause the added monomer to polymerize in situ in the form of a dispersion of finely divided particles in said vehicle.

11. A process in accordance with claim 10 wherein the diepoxide resin has an initial molecular weight not substantially below 4,000 and provides at least 50 percent of the solids content of the initial reactants from which the resinous reaction product was formed.

12. A process in accordance with any one of claims 10, or 11, wherein the said ethylenically unsaturated monomer in said addition polymer and in said addition polymer side chains comprises a sufficient amount of an acrylic acid that the Acid Number of the nonvolatile material in said resinous reaction product is in the range from 30 to 200.

13. A process in accordance with claim 10 wherein the said initiator is a redox-type initiator and the temperature of the reaction for polymerizing the added addition polymerizable monomer is in the range from about 50° C. to about 100° C.

14. A process in accordance with any one of claims 10, or 11, wherein the ionized groups are ionized amine groups present in the graft polymer molecule.

15. A process for increasing the addition polymer content of a dispersion of an acid-functional resinous reaction product in an aqueous vehicle that includes a fugitive base, wherein the said resinous reaction product comprises:

a. an aromatic 1,2-epoxy diepoxide resin having a molecular weight above 4,000 and having a backbone chain that includes aliphatic backbone carbons having only one or two hydrogens bonded thereto;

b. addition polymer formed in the presence of the diepoxide resin by free radical initiation polymerization of ethylenically unsaturated monomer including an acrylic acid, and c. graft polymer consisting of a backbone of an aromatic 1,2-epoxy diepoxide resin, of the same kind as in (a) hereof, to which backbone an ionizable addition polymer side chain is bonded by a carbon-to-carbon bond in place of a hydrogen atom that is present on an aliphatic carbon of the backbone in the ungrafted resin, said addition polymer side chain being grafted by a carbon-to-carbon bond to a said aliphatic backbone carbon atom by addition polymerization of ethylenically unsaturated monomer comprising an acrylic acid in the presence of the diepoxide resin;

the said liquid vehicle including at least one water-miscible liquid organic solvent that facilitates processing; said resinous reaction product having an Acid Number on nonvolatiles in the range from about 30 to about 200, said addition polymer and said graft polymer being ionized, and the resinous reaction product being present in the aqueous vehicle as a dispersoid; comprising, adding addition polymerizable monomer containing ethylenic unsaturation, and initiator for the addition polymerization thereof, to said dispersion, and imposing conditions of temperature, pressure, concentration and agitation thereon that cause the added monomer to polymerize in situ in the form of a dispersion of finely divided particles in said vehicle.

16. The process of claim 15 wherein the initiator for the added addition polymerizable monomer is a redox-type initiator, and the temperature of reaction for polymerizing the added addition polymerizable monomer is in the range from about 70° C. to about 90° C.

17. The process of claim 15 or 16 wherein the amount of water initially present in said aqueous vehicle and any amount of water that is added during said polymerization is sufficient for keeping the solids content of the reaction mixture from exceeding about 60% by weight of the reaction mixture at any time.

18. The process of claim 17 wherein the molecular weight of the initial diepoxide resin, from which the resinous reaction product is formed, is in the range from about 4,000 to about 40,000 and supplies at least 50% of the solids of the reaction mixture from which the resinous reaction product is formed.

19. The process of claim 18 wherein the initial diepoxide supplies from 60% to 90% of the solids of the reaction mixture from which the resinous reaction product is formed.

20. A process comprising:
(1) mixing together:

(a) a dispersion in an aqueous liquid vehicle of a fugitive base and an associatively-formed resinous blend comprising:
  (i) carboxylic acid-functional graft polymer that forms at least 25% by weight of said blend,
  (ii) ungrafted carboxylic acid-functional addition polymer, and
  (iii) ungrafted aromatic 1,2-epoxy diepoxide resin; said graft polymer being an aromatic 1,2-epoxy diepoxide resin component having a backbone comprising aliphatic carbon atoms that have only one or two hydrogens bonded thereto in the ungrafted state, onto which backbone is grafted an addition polymer side chain component by a carbon-to-carbon bond to one of said aliphatic carbon atoms in place of one of said hydrogens, said graft polymer and said ungrafted addition polymer being acid functional and containing carboxylic acid units furnishing carboxyl groups that constitute at least about 5% of the weight of said blend; the ungrafted epoxy resin and the epoxy resin component of said graft polymer having an initial molecular weight above 1,000 and together constituting at least about 30% of said blend by weight; said acid functional polymers being ionized in the dispersion;
(b) addition polymerizable monomer containing ethylentic unsaturation, and
(c) initiator material for causing the monomer of (b) to polymerize; the proportion of the ionized blend solids of (a) to the weight quantity Q of monomer solids of (b) being from about 0.3 Q to about 20 Q;
(2) maintaining the mixture under conditions of agitation and temperature to permit completion of the addition polymerization of the (b) monomer, with the addition polymer so formed being in the form of a dispersion of finely divided particles in said vehicle, and
(3) recovering a dispersion of finely divided particles in said aqueous vehicle, the extent of the ionization being sufficient that the recovered product is dispersed.

21. The process of claim 20 wherein said epoxy resin component has an initial molecular weight above about 4,000 and an oxirane content not substantially above about 2%, and wherein the ungrafted epoxy resin and the epoxy resin component of the graft polymer together furnish from 50% to 90% by weight of the solids of the resinous blend.

22. The process of claim 21 wherein the Acid Number (N.V.) of said blend (a) is between about 40 and about 150, said fugitive base comprises an alkanolamine, and said epoxy resin is a bisphenol A-epichlorohydrin reaction product.

23. The process of claim 22 wherein the epoxy resin component is terminated so that substantially all of the epoxy groups have been eliminated.

24. A process for polymerizing in situ, in an aqueous vehicle, ethylenically unsaturated monomer in an aqueous dispersion of polymers comprising a 1,2-epoxy aromatic diepoxide and at least one ionized polymer comprising a graft copolymer comprising an aromatic 1,2-epoxy diepoxide resin having a backbone including aliphatic carbon atoms having one or two hydrogens bonded thereto in the ungrafted state, and at least one side chain bonded by carbon-to-carbon grafting to one of said backbone carbons in place of one of said hydrogens, the ionization being on the side chain, comprising:
  bringing together at least one ethylenically unsaturated monomer, initiator therefor, and the aqueous dispersion of epoxy resin and the said at least one ionized polymer, under conditions of pressure, temperature, concentration, and agitation that permit said monomer to polymerize in situ in the dispersion in dispersed form, and recovering a product dispersion.

25. The process of claim 24 wherein said side chains of the graft polymer include carboxyl units that impart acid functionality to the graft polymer, and wherein a fugitive base is present in said aqueous dispersion, ionizing said carboxyl groups.

26. A process for preparing a sprayable water-reducible composition that is suitable for formulation to a sanitary coating composition for spray application and bake-curing on the surface of a container for an edible material or beverage, by increasing the addition polymer content of a dispersion of a resinous reaction product in an aqueous vehicle that includes a basic ionizing agent that is fugitive at bake-curing temperatures, wherein the said resinous reaction product comprises:
  a. an aromatic 1,2-epoxy diepoxide resin having a molecular weight above about 4,000 and having a backbone that includes aliphatic backbone carbons having only one or two hydrogens bonded thereto;
  b. addition polymer formed in the presence of the epoxy resin by the free radical polymerization of ethylenically unsaturated monomer including an acrylic acid, and
  c. graft polymer consisting of a backbone of an aromatic 1,2-epoxy diepoxide resin, of the same kind as in (a) hereof, to which backbone an ionizable addition polymer side chain is bonded by a carbon-to-carbon bond in place of a hydrogen atom that is present on an aliphatic carbon of the backbone in the ungrafted resin, said addition polymer side chains being grafted by carbon-to-carbon bonds to at least some molecules of the epoxy resin at said aliphatic backbone carbons by the free radical addition polymerization of the ethylenically unsaturated monomer comprising an acrylic acid in the presence of the diepoxide resin, and in the presence of at least 3% by weight benzoyl peroxide based on said monomer, or equivalent free radical initiating conditions for said reaction;

the acrylic acid being present in the monomer in sufficient quantity to impart acid functionality to the addition polymer and to the graft polymer, and to impart to said resinous reaction product an Acid Number on nonvolatiles in the range from about 80 to about 90; said aqueous dispersion having a pH in the range from about 7 to about 9; the said aqueous vehicle including liquid organic solvent material that facilitates handling, water, and basic ionizing agent that ionizes the said acid-functional polymers; said process comprising:
  adding to said aqueous dispersion up to about 40% by weight of the total solids content of the dispersion of additional polymerizable monomer containing ethylenic unsaturation, and initiator for the addition polymerization thereof, and
  maintaining conditions of temperature, pressure, and agitation that cause the added monomer to polymerize in situ in the form of a dispersion of finely divided particles in said vehicle, the extent of the ionization being sufficient to establish and to maintain the recovered polymeric product in dispersed form.

27. The process of claim 26 wherein the fugitive base comprises an alkanolamine, the epoxy resin is a bisphenol A-epichlorohydrin reaction product, said epoxy resin and graft polymer have less than about 2% oxirane content, and wherein the addition polymerizable monomer that is added to the aqueous dispersion comprises styrene and an acrylic acid.

28. A dispersion of finely divided film-forming synthetic polymeric solids in an aqueous vehicle for use as a coating or paint, comprising on a dry solids basis where Q is a weight quantity:
 (a) about 0.3 Q to about 20 Q of at least one ionized film forming polymer comprising a graft copolymer comprising an aromatic 1,2-epoxy diepoxide resin having a backbone including aliphatic carbon atoms having one or two hydrogens bonded thereto in the ungrafted state, and at least one side chain bonded by carbon-to-carbon grafting to one of said backbone carbons in place of one of said hydrogens, the ionization being on the side chain;
 (b) from zero up to about 20 Q of a second polymer comprising an aromatic 1,2-epoxy diepoxide resin that is not appreciably ionic in nature;
said ionized polymer and said not appreciably ionic polymer constituting part of the dispersed phase of said dispersion, the ionization being sufficient to establish and to maintain the aforesaid polymers in dispersed form in said aqueous vehicle, and
 (c) a quantity Q of solids formed by at least one in situ addition polymerization of ethylenically unsaturated addition polymerizable monomer added to and polymerized in said aqueous dispersion in finely divided particulate form.

29. The dispersion of claim 28 wherein said addition polymer side chains include monomer units of an acrylic acid, which said units are ionized.

30. The dispersion of claim 28 wherein said addition polymer side chains include units of an unsaturated amine, which units contain ionized amino nitrogen.

31. The dispersion of claim 28 wherein there is about 0.3 Q to about 6 Q of said second polymer, which is an aromatic 1,2-epoxy diepoxide resin or a terminated aromatic 1,2-epoxy diepoxide resin.

32. A composition of matter for use as a coating or paint, comprising a dispersion in an aqueous vehicle of film-forming synthetic polymeric materials, said dispersion having as a dispersed phase preformed graft polymer containing ionized units, formed from a polymer selected from the group consisting of: homo-polymers and copolymers of vinyl chloride; homopolymers and copolymers of acrylic monomers; hydrocarbon resins from butadiene, styrenes, and coumarone-indenes; polyurethanes; polyesters; and aromatic epoxy resins; said selected polymer having a backbone carbon chain including aliphatic carbon atoms having only one or two hydrogens bonded thereto, and said graft polymer being formed by having at least one side chain grafted to the backbone carbon chain by a carbon-to-carbon bond in place of one of said hydrogens, wherein the ionized units are located on the side chain, and an in situ polymerized ethylenically unsaturated monomer, in the form of a dispersion of finely divided particles in said vehicle, the ionization being sufficient to establish and to maintain the aforesaid polymers in dispersed form in said aqueous vehicle.

33. A composition according to claim 52 that also comprises preformed addition polymerized ethylenically unsaturated monomer, associatively formed with said graft polymer, the ionization being sufficient to establish and to maintain the aforesaid polymers in dispersed form in said aqueous vehicle.

34. A composition according to claim 33 wherein said graft polymer comprises an aromatic 1,2-epoxy diepoxide resin having an epoxy equivalent weight of at least 500 in its ungrafted state and having an aliphatic backbone carbon chain that comprises the backbone of the graft polymer, wherein the side chain comprises polymerized monomer units of ethylenically unsaturated monomer comprising an acrylic acid.

35. A composition in accordance with claim 34 wherein the molecular weight of the graft polymer is not substantially below 4,000.

36. A composition according to claim 35 wherein said epoxy resin has an epoxy requivalent weight of at least 2,000 in its ungrafted state and wherein the side chain comprises polymerized ethylenically unsaturated monomer units comprising a copolymer of methacrylic acid, styrene, and a lower alkyl acrylate.

37. A composition according to claim 33, wherein said graft polymer comprises an aromatic 1,2-epoxy diepoxide resin having an epoxy equivalent weight of at least 500 in its ungrafted state and having an aliphatic backbone carbon chain that comprises the backbone of the graft polymer, wherein the side chain comprises polymerized monomer units of ethylenically unsaturated monomer including amino nitrogen that furnishes the ionizable sites of the graft polymer.

38. A composition of matter for use as a coating of paint, comprising a liquid aqueous vehicle containing therein an ionizing agent and a pre-formed graft polymer having an aromatic 1,2-epoxy diepoxide resin backbone, the epoxy resin having an epoxy equivalent weight of at least 500 in its ungrafted state and having aliphatic backbone carbon chains including aliphatic carbon atoms having only one or two hydrogens bonded thereto, to which backbone at least one side chain is bonded by carbon-to-carbon grafting to an aliphatic backbone carbon of the epoxy resin in place of one of said hydrogens, whereby the graft polymer is resistant to hydrolysis at the grafting site, the side chain comprising polymerized ethylenically unsaturated monomer units furnishing ionizable sites, the composition also comprising preformed addition polymerized ethylenically unsaturated monomer associatively formed with said graft polymer by addition polymerization of ethylenically unsaturated monomer in the presence of the epoxy resin, and in the presence of at least 3% by weight benzoyl peroxide based on said monomer, or equivalent free radical initiating conditions for said reaction, said liquid vehicle comprising a mixture of water and of at least one water-miscible organic solvent liquid, and an in situ polymerized ethylenically unsaturated monomer, all of said polymers being synthetic film-forming polymers, the ionization being sufficient to establish and to maintain the aforesaid polymers in dispersed form in said aqueous vehicle.

39. A composition according to claim 38 wherein the epoxy resin backbone in its ungrafted state has an epoxy equivalent weight not substantially below 2,000.

40. A water-reducible composition for use as a coating or paint, comprising in situ polymerized ethylenically unsaturated monomer in a dispersion of a resinous reaction product in an aqueous vehicle, wherein the resinous reaction product comprises:

a. an aromatic 1,2-epoxy diepoxide resin having an epoxy equivalent weight above about 2,000 and having a backbone chain that includes aliphatic backbone carbon atoms having only one or two hydrogen atoms bonded thereto;

b. addition polymer formed in the presence of the diepoxide resin by addition polymerization of ethylenically unsaturated monomer including an acrylic acid; and c. graft polymer consisting of a backbone of an aromatic 1,2-epoxy diepoxide resin, of the same kind as in (a) hereof, to which backbone an ionizable addition polymer side chain is bonded by a carbon-to-carbon bond in place of a hydrogen atom that is present on an aliphatic carbon of the backbone in the ungrafted resin, said addition polymer side chain being grafted by a carbon-to-carbon bond to a said aliphatic backbone carbon by free radical initiated addition polymerization of ethylenically unsaturated monomer comprising an acrylic acid in the presence of the diepoxide resin, and in the presence of at least 3% by weight benzoyl peroxide based on said monomer, or equivalent free radical initiating conditions for said reaction, the acrylic acid being present in the monomer in sufficient quantity to impart acid functionality to the addition polymer and to the graft polymer, and to impart to the resinous reaction product an Acid Number on non-volatiles in the range from about 40 to about 150;

said aqueous vehicle including at least one water-miscible organic solvent liquid in which the said diepoxide resin is soluble, said composition having a pH in the range from about 7 to about 9, the in situ polymerized monomer providing up to about 40% by weight of the total solids content of the composition, all of said polymers being synthetic film-forming polymers, and said aqueous vehicle including a fugitive base, that ionizes the acid-functional polymers, the ionization being sufficient to establish and to maintain the aforesaid polymers in dispersed form in said aqueous vehicle.

41. A composition in accordance with claim 40 wherein the fugitive base comprises an alkanolamine, the said epoxy resin is a bisphenol A-epichlorohydrin reaction product, said graft polymer has less than about 2% oxirane content, and wherein the in situ polymerized monomer comprises styrene.

42. A sprayable, water-reducible composition suitable for use in the formation of sanitary coatings, in accordance with claim 41, wherein the Acid Number on non-volatiles of the resinous reaction product is in the range from about 80 to about 90, and at least 50% of the solids content of the resinous reaction product is derived from ungrafted epoxy resin and the epoxy resin component of the graft polymer.

43. A sprayable, water-reducible composition suitable for use in the formulation of sanitary coatings comprising an in situ polymerized ethylentically unsaturated monomer in a dispersion of a film-forming resinous reaction product in an aqueous vehicle, the sprayable composition having said aqueous vehicle as a continuous phase and finely divided film-forming synthetic polymer solids, including said resinous reaction product, dispersed in the aqueous vehicle as a discontinuous phase, the sprayable composition comprising, on a 100% total weight basis:

a. from about 10% to about 30% of said finely divided solids forming a continuous phase, and b. the balance up to 100% thereof being the aqueous vehicle;

c. the finely divided solids comprising, on a 100% total non-volatile solids basis:

i. from about 5% to about 40% by weight of in situ polymerized ethylenically unsaturated monomers, and ii. the balance up to 100 weight percent thereof being provided by said resinous reaction product that in turn comprises, (1) an aromatic 1,2-epoxy diepoxide resin having an epoxy equivalent weight not substantially below about 2,000 and having a backbone chain that includes aliphatic backbone carbon atoms having only one or two hydrogens bonded thereto;

(2) addition polymer formed by the addition polymerization of ethylenically unsaturated monomer that furnishes ionizable sites in the addition polymer, and (3) graft polymer consisting of a backbone of an aromatic 1,2-epoxy diepoxide resin, of the same kind as in (1) hereof, to which backbone an ionizable addition polymer side chain is bonded by a carbon-to-carbon bond in place of a hydrogen atom that is present on an aliphatic carbon of the backbone in the ungrafted resin, said addition polymer side chain being grafted by a carbon-to-carbon bond to a said aliphatic backbone carbon of the diepoxide resin by free radical initiated addition polymerization of ethylenically unsaturated monomer in the presence of the epoxy resin and in the presence of at least 3% by weight benzoyl peroxide based on said monomer, or equivalent free radical initiating conditions for said reaction;

said addition polymer and said graft polymer having ionizable sites, the ionizable sites of the graft polymer being located in its side chains; the said aqueous vehicle including water, at least one water-miscible organic solvent, and a fugitive ionizing agent, the said polymers being ionized in said vehicle by said ionizing agent, the extent of ionization being sufficient to establish and to maintain the solids dispersed in the aqueous vehicle in finely divided particulate form.

44. A composition in accordance with claim 43 wherein the said solvent comprises 25% or less by weight of said composition.

45. A composition in accordance with claim 43 wherein the ionizable sites are carboxyl units and the ionizing agent is a fugitive basic material.

46. A composition in accordance with claim 43 wherein the ionizable sites are tertiary amino nitrogens and the ionizing agent reacts to form either an ionized tertiary amino nitrogen or a quaternized nitrogen.

* * * * *